United States Patent
Aizman et al.

(10) Patent No.: US 9,081,683 B2
(45) Date of Patent: Jul. 14, 2015

(54) ELASTIC I/O PROCESSING WORKFLOWS IN HETEROGENEOUS VOLUMES

(71) Applicant: NEXENTA SYSTEMS, INC., Santa Clara, CA (US)

(72) Inventors: Alexander Aizman, Santa Clara, CA (US); Boris Protopopov, Acton, MA (US)

(73) Assignee: Nexenta Systems, Inc., Santa Clara, CA (US)

( * ) Notice: Subject to any disclaimer, the term of this patent is extended or adjusted under 35 U.S.C. 154(b) by 238 days.

(21) Appl. No.: 13/904,935

(22) Filed: May 29, 2013

(65) Prior Publication Data

US 2014/0229675 A1    Aug. 14, 2014

Related U.S. Application Data

(60) Provisional application No. 61/762,586, filed on Feb. 8, 2013.

(51) Int. Cl.
  *G06F 12/02*  (2006.01)
  *G06F 12/08*  (2006.01)
  *G06F 3/06*   (2006.01)

(52) U.S. Cl.
  CPC .............. *G06F 12/08* (2013.01); *G06F 3/0608* (2013.01); *G06F 3/0634* (2013.01); *G06F 3/0653* (2013.01); *G06F 3/0685* (2013.01)

(58) Field of Classification Search
  CPC ... G06F 3/0608; G06F 3/0634; G06F 3/0653; G06F 3/0685
  See application file for complete search history.

(56) References Cited

U.S. PATENT DOCUMENTS

| | | | |
|---|---|---|---|
| 2002/0083264 A1* | 6/2002 | Coulson | 711/112 |
| 2011/0035548 A1* | 2/2011 | Kimmel et al. | 711/114 |
| 2012/0011337 A1 | 1/2012 | Aizman | |
| 2012/0017043 A1 | 1/2012 | Aizman | |
| 2012/0198115 A1* | 8/2012 | Cho | 710/301 |
| 2012/0246403 A1* | 9/2012 | McHale et al. | 711/114 |
| 2012/0278527 A1* | 11/2012 | Cho et al. | 711/103 |
| 2013/0238832 A1* | 9/2013 | Dronamraju et al. | 711/103 |
| 2013/0238851 A1* | 9/2013 | Chang et al. | 711/113 |

* cited by examiner

*Primary Examiner* — Hiep Nguyen
(74) *Attorney, Agent, or Firm* — Okamoto & Benedicto LLP

(57) ABSTRACT

The present disclosure provides advantageous methods and systems for input/output processing workflows in a heterogeneous data volume. One embodiment relates to a method of writing data to a heterogeneous data volume having multiple disk classes of storage. A class of storage tier for the data write is selected using operating modes for the tiers, where the operating mode for a tier instance depends on statistical measures of operating parameters for that tier. One operating mode is an elastic mode, where the chance that a tier instance is selected may vary depending on a statistical measure of an operating parameter in relation to lower and upper threshold values. Other embodiments, aspects and features are also disclosed.

23 Claims, 14 Drawing Sheets

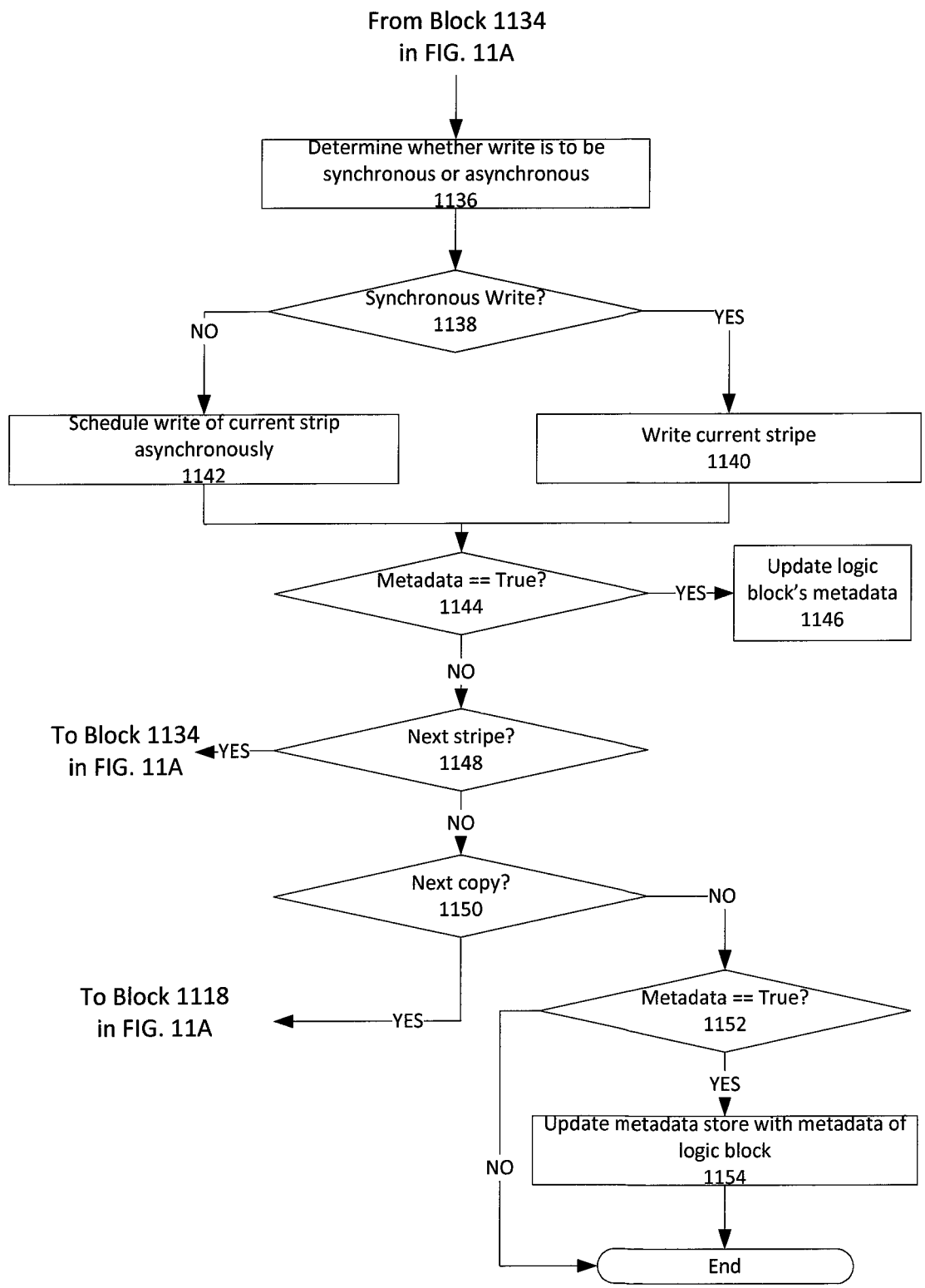
FIG. 11B        1100

ELASTIC I/O PROCESSING WORKFLOWS IN HETEROGENEOUS VOLUMES

CROSS-REFERENCE TO RELATED APPLICATION(S)

The present patent application claims the benefit of U.S. Provisional Patent Application No. 61/762,586, entitled "Elastic I/O Processing Workflows in Heterogeneous Volumes," filed Feb. 8, 2013 by Alexander Aizman et al., the disclosure of which is hereby incorporated by reference in its entirety. The present patent application is related to U.S. patent application Ser. No. 13/239,258 (published under U.S. Patent Application Publication No. 2012/0017043 A1), entitled "Method and System for Heterogeneous Data Volume," filed Sep. 21, 2011 by Alexander Aizman et al., the disclosure of which is hereby incorporated by reference in its entirety.

BACKGROUND

1. Technical Field

The present disclosure relates generally to data storage systems.

2. Description of the Background Art

Typical data volumes comprise one or more storage disks. The disks used to store user and application data are typically identical and configured into one or more redundancy groups (RG) to provide increased capacity, input/output (I/O) performance (i.e. write/read performance), fault tolerance and improved data availability.

Storage provided by data volumes are utilized by various applications. Most commonly, those applications include filesystems, databases and object storage systems. Each of these applications provides a certain application-specific service to upper layers and users (for instance, a filesystem provides and facilitates file storage and file management) while utilizing block-level services by the underlying data volume or volumes.

SUMMARY

The present disclosure relates to heterogeneous data storage systems, methods and architectures.

One embodiment relates to a method of writing data to a heterogeneous data volume having multiple disk classes of storage. A class of storage tier for the data write is selected using operating modes for the tiers, where the operating mode for a tier instance depends on statistical measures of operating parameters for that tier. One operating mode is an elastic mode in which the chance that a tier instance is selected may vary depending on a statistical measure of an operating parameter in relation to lower and upper threshold values.

Another embodiment relates to a data storage system that includes at least a heterogeneous data volume, a mode determination module, and a selection module. The heterogeneous data volume includes a plurality of redundancy groups, each redundancy group being a member of one of a plurality of class of storage (CoS) tiers. The mode determination module determines operating modes for the plurality of CoS tiers using statistical measures of operating parameters and threshold values for the statistical measures. The selection module consults the mode determination module to determine the operating modes, and uses the operating modes to select a CoS tier. Additionally, the selection module determines the cost of writing data to the redundancy groups within the selected tier, and selects a redundancy group for a data write based on the determined costs.

Other embodiments, aspects, and features are also disclosed.

DETAILED DESCRIPTION

Homogeneous Data Volumes

Figure 1:
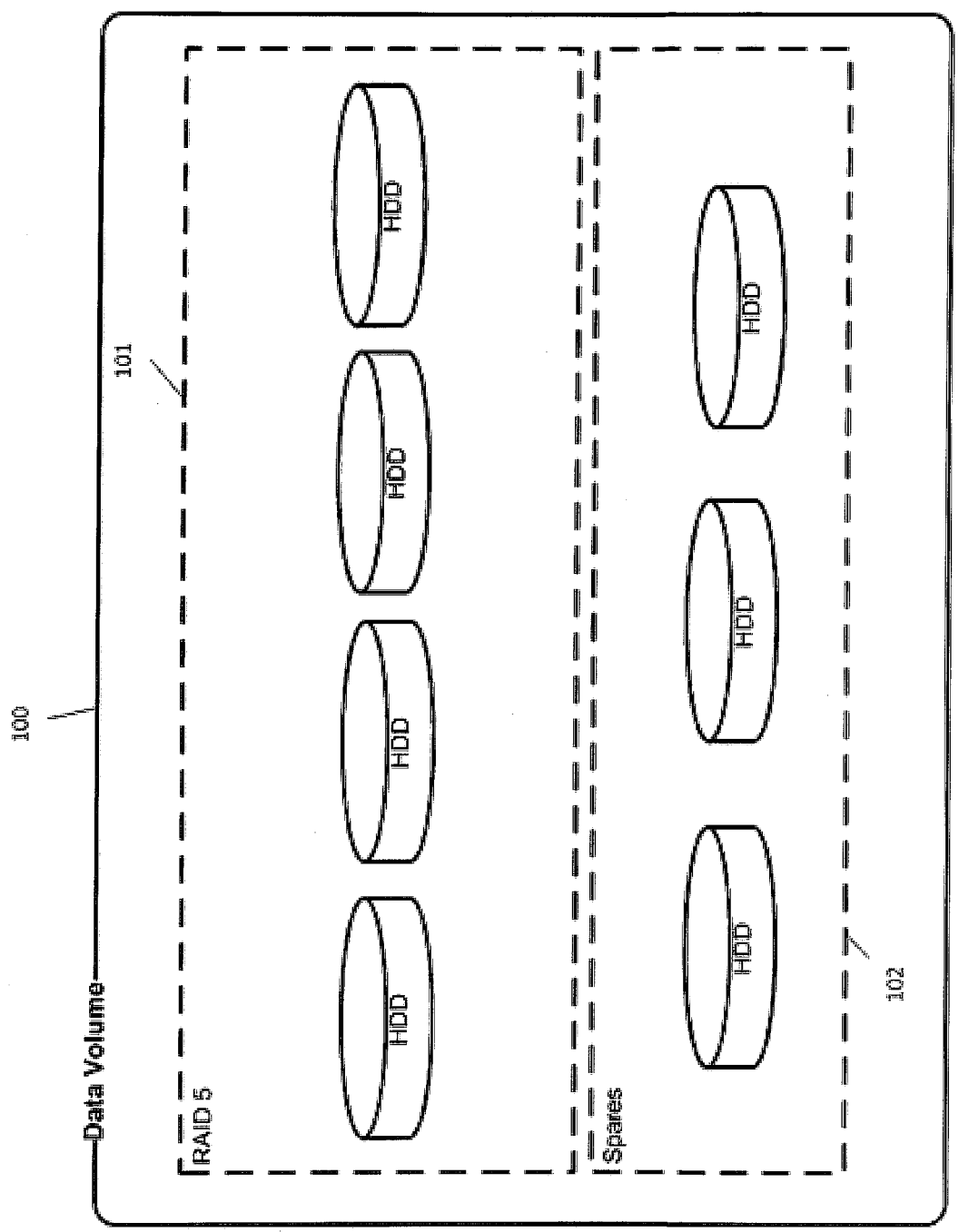
FIG. 1 depicts a typical non-heterogeneous data volume.

FIG. 1 illustrates a typical homogeneous (non-heterogeneous) data volume 100 with a single RAID-5 group 101, including a plurality of four data disks and three spare disks 102. In general, the RAID-5 replication scheme works as follows. Each logical block submitted by an application for writing is first segmented into data blocks. Assuming the RAID-5 group 101 includes four data disks, for each set of three data blocks an additional parity block would have to be generated. The three data blocks and the parity block in combination are said to be a stripe. Logical blocks are then written to the data volume 100 in stripes, wherein each stripe spans the entire four disks and includes three data blocks and one parity block.

Heterogeneous Data Volumes

U.S. patent application Ser. No. 13/329,258, entitled "Method and System for Heterogeneous Data Volume," filed Sep. 21, 2011 by inventors Alexander AIZMAN, et al. (published under Publication No. US 2012/0017043 A1) introduces a heterogeneous block-level storage subsystem. The disclosure of U.S. Patent Application Publication No. US 2012/0017043 A1 is hereby incorporated by reference in its entirety. As disclosed therein, the underlying storage disks in the heterogeneous block-level storage subsystem are different with respect to disk vendor, model, capacity, locality (local or remotely attached), I/O latency, and/or I/O throughput. In combination, these disk characteristics are referred to as disk Class of Storage, or disk CoS. Such Classes of Storage (CoSs) may be optionally enumerated, and an ordering relationship is introduced, such that, for instance, it is possible to state that $CoS_2$ is lower than $CoS_1$, and $CoS_3$ is higher than $CoS_4$.

A heterogeneous block-level storage subsystem that comprises disks of different classes of storage (different CoS) is henceforth referred to as a Heterogeneous Volume (HV). An HV includes two or more redundancy groups (RGs) comprised of the disks that have different and distinct disk CoS. In other words, a HV includes at least two different and distinct disk Classes of Storage. A disk CoS may also be referred to as a "class of disk". Each distinct disk CoS is associated with distinct per class management properties.

A redundancy group that consists of a single disk is considered a trivial redundancy group. Preferably, each RG provides a certain level of data redundancy and fault tolerance: the capability to withstand a failure of one or more disks.

The methods and systems provided by the present disclosure do not require an RG to be actually redundant. In other words, disclosed methods and systems do not rely on redundancy and do not require actual redundancy. Hence, in accordance with an embodiment of the invention, the only substantive requirement for an HV is to have two or more included disk Classes of Storage.

In addition to the functionality of conventional data volumes, an HV provides an additional capability for various applications, including filesystems, databases and object storage systems, to further control and optimize I/O processing while storing/retrieving data by optionally supplying application-level Class of Storage labels (CoS label) with data blocks written to or read from the data volume.

Figure 2:
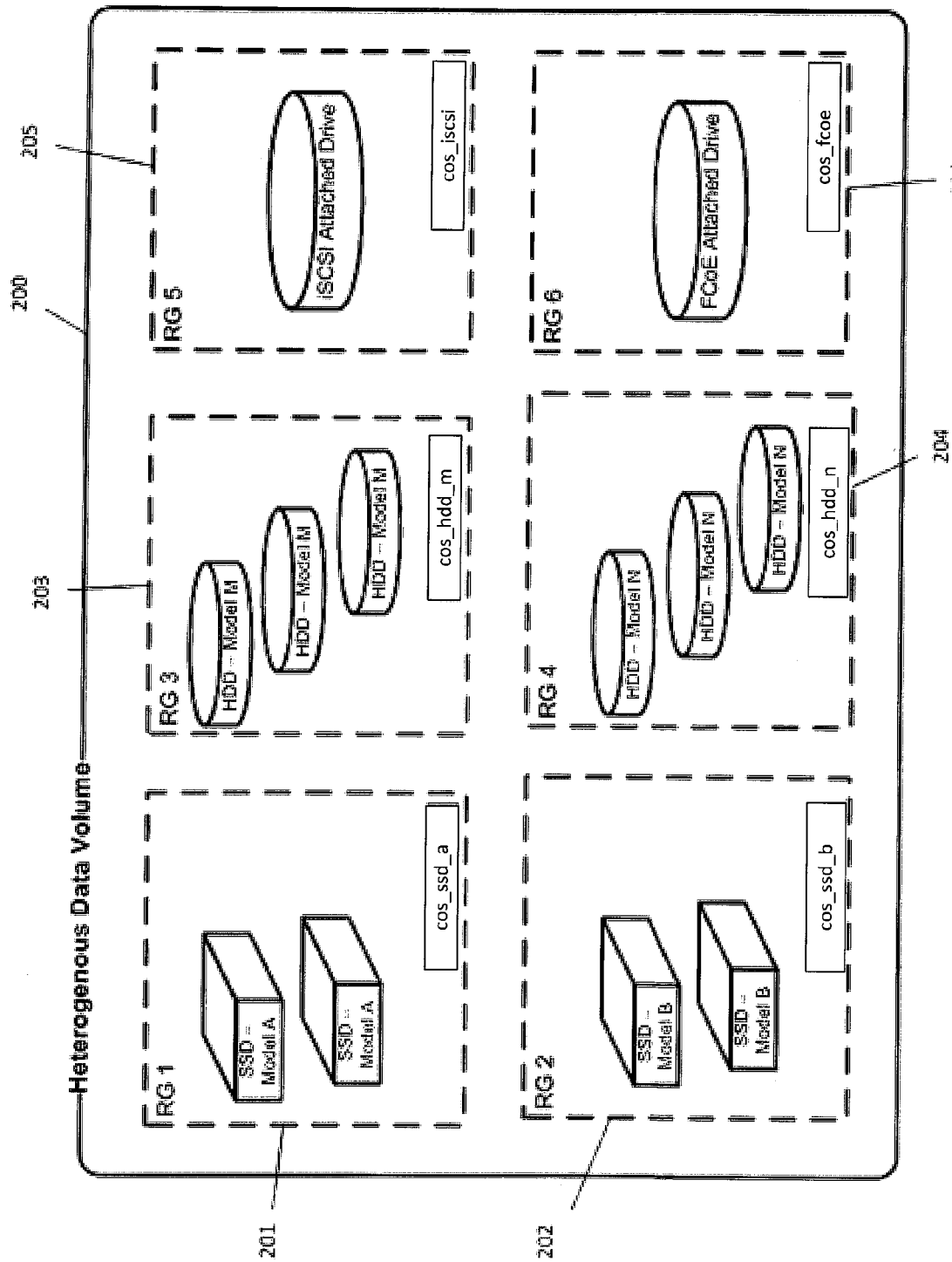
FIG. 2 depicts an exemplary heterogeneous data volume with multiple redundancy groups having distinct classes of storage in accordance with an embodiment of the invention.

FIG. 2 illustrates an example heterogeneous data volume (HV) 200 in RAID-0 configuration that includes 6 (six) redundancy groups (RG1 201, RG2 202, RG3 203, RG4 204, and RG5 205 and RG6 206) with distinct disk Classes of Storage. In this example, the distinct disk CoSs for RG1-RG6 are labeled 'cos_ssd_a', 'cos_ssd_b', 'cos_hdd_m', 'cos_hdd_n', 'cos_iscsi' and 'cos_fcoe', respectively, and are associated with one or more 'Model A' solid state drives (SSDs), 'Model B' SSDs, 'Model M' hard disk drives (HDDs), 'Model N' HDDs, Internet Small Computer System Interface (iSCSI) attached drives, and Fibre Channel over Ethernet (FCoE) attached drives, respectively. Since the redundancy groups (RGs) in this figure include identical (homogenous) disks within each RG, the CoS of each RG is the same as that of the disks contained in the RG.

Figure 3:
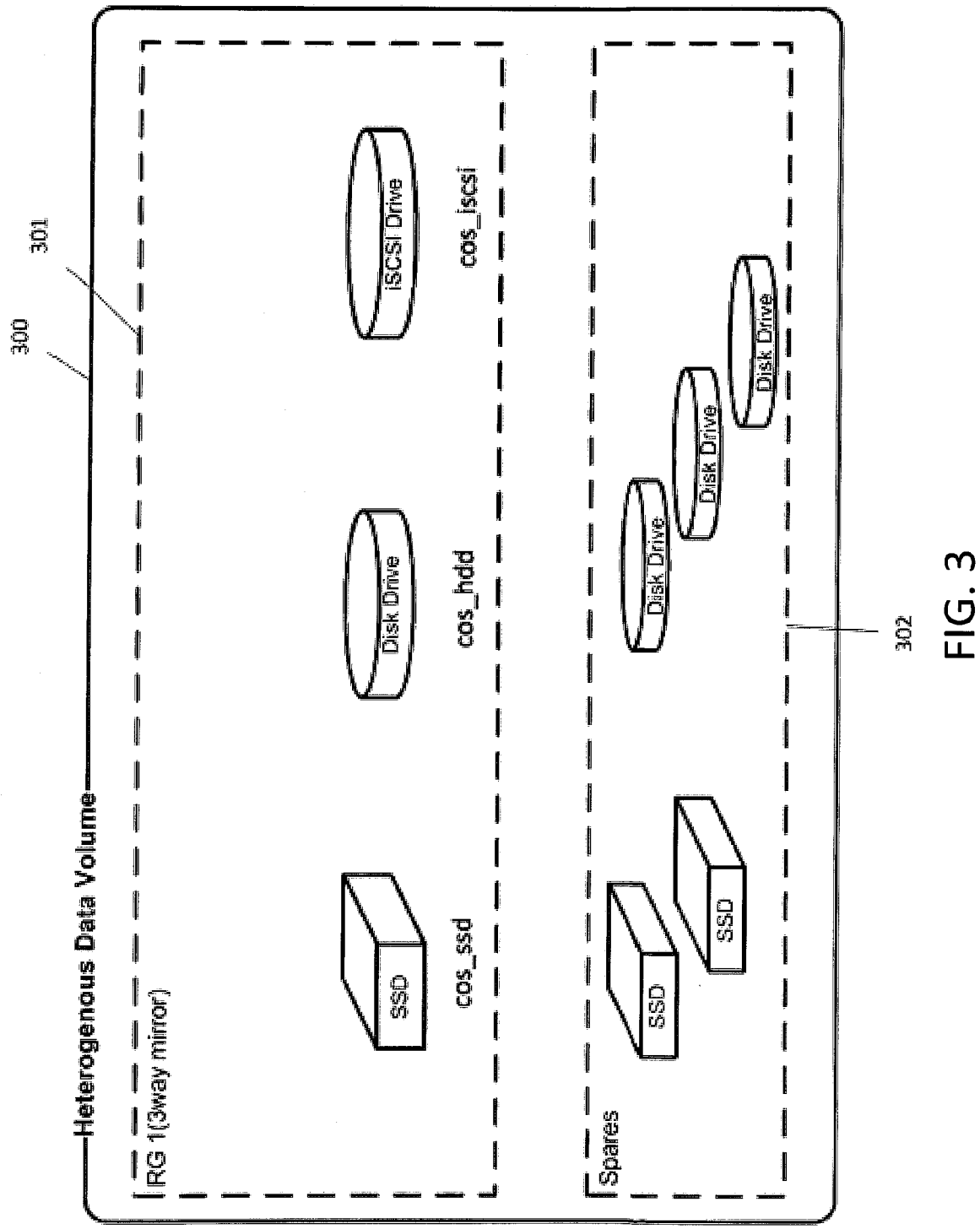
FIG. 3 depicts an exemplary heterogeneous data volume with a single redundancy group as a three-way mirror with distinct classes of storage in accordance with an embodiment of the invention.

FIG. 3 illustrates a heterogeneous data volume 300 configured with a single redundancy group (RG1 301) as a three way mirror with distinct classes of storage accounting for SSD, HDD and iSCSI drives. The HV 300 in FIG. 3 also includes two spare SSDs and three spare HDDs located in spare area 302. Redundancy group RG1 301 comprises an SSD with disk CoS 'cos_ssd', HDD with disk CoS 'cos_hdd', and an iSCSI attached drive with disk CoS 'cos_iscsi'.

Tiered Storage

As used herein, the terms "storage tiers" and "tiered storage" describe multi-volume heterogeneous storage environments, whereby each tier provides for a specific set of requirements with respect to price, performance, capacity and function. For instance, a 4-tiers environment may include:

1) Tier 1 also known as a "service tier" which immediately faces clients and is typically the fastest and the most expensive storage media for mission critical applications;
2) Tier 2 for non-mission critical applications;
3) Tier 3 for hourly and daily backups; and
4) Tier 4 for monthly and yearly backups, long term archive, data-at-rest, etc.

In the "tiered storage" sense, a tiered HV, therefore, is a data volume with its contained redundancy groups (RGs) and disks that form storage tiers with respect to price, performance, capacity and function. For instance, HV 200 in FIG. 2 may include 4 (four) distinct intra-volume tiers as follows:

1) Tier 1 (RG1 201 and RG2 202);
2) Tier 2 (RG3 203 and RG4 204);
3) Tier 3 (RG6 206); and
4) Tier 4 (RG5 205).

Here, Tier 1 would serve as a primary storage, Tiers 2 and 3 provide for non-mission critical applications and frequent intra-volume backups, and lastly, Tier 4 would be used for data-at-rest.

As the goal of arranging storage in multiple tiers is to organize storage devices and RGs with similar characteristics and to intelligently use them to meet application requirements, it is only fitting to associate a specific CoS, or a range thereof, with each tier. The enumeration and the ordering mentioned earlier and established over the set of CoSs in the HV allows one to naturally refer to the tiers as "lower" and "higher" tier. For instance, in the above example, Tier 1 is higher than Tier 2, and Tier 4 is lower than Tier 3. This and similar references to the ordering of tiers elsewhere in the present application refer to the CoS enumeration and ordering as discussed above.

Heterogeneous Data Volume Capabilities and I/O Load-Balancing Challenge

In summary, a heterogeneous data volume provides the following capabilities and features:

1) HV provides for associating optimal access (read, write) mechanism with each specific application-level CoS label;
2) HV allows for placement of data blocks labeled with various CoS labels (e.g. filesystem metadata vs. filesystem data, database index vs. database data, object storage metadata vs. object data) on specific storage tiers in accordance to pre-configured mappings of those application-level CoS labels to the underlying classes of disks (disk CoS) of the storage tiers;
3) HV supports matching of the application-level CoS labels with the underlying classes of disk storage (disk CoS), to select a subset of disks and redundancy groups of the volume to read and write data;
4) Guided by the storage management software (SMS), HV allows for biasing reads within a redundancy group (RG), based on assignment of read preference values to devices within the group; and
5) HV supports additional or alternative I/O processing stages, such as data checksumming, compression, encryption, and de-duplication, to protect and transform application data on a per Class of Storage label basis.

Thus, a heterogeneous data volume addresses several tradeoffs that system administrators and information technology (IT) managers are forced to make when deploying conventional "homogeneous" (non-heterogeneous data) volumes, namely: the tradeoff between capacity and performance, the tradeoff between performance and cost, and the tradeoff between cost and MTTF. For instance, conventional rotating hard disk drives (HDDs) are typically less expensive than Solid State Drives (SSDs). On the other hand, SSDs are generally superior as far as I/O latency compared to HDDs.

At the same time, applications that use data volumes have different needs and different requirements for storing and retrieving data and application-level metadata. A single given application may often generate two or more I/O workloads whereby each specific workload would benefit from using specific storage media, that is—specific disk CoS.

For instance, filesystem metadata is typically relatively small in size and I/O latency sensitive, while filesystem data may be two or more orders of magnitudes larger in size than the metadata and may require better throughput and/or less expensive capacity (i.e. a lower dollar-to-gigabyte ratio).

Inter-application differences are often even more pronounced. For instance, Microsoft Exchange would generally require backend storage distinctly different from the one required to support high performance computing (HPC) applications, as well as the one to support storage for virtual desktops.

In addition, users of the filesystems, databases, object storage systems and other applications will also require different level of service, depending on the relative value of the user data, dollar amount paid for service and multiple other factors.

All of the above makes it very difficult for system administrators and information technology (IT) managers to reconcile multiple and simultaneously diverse requirements as far as storage capacity, performance, cost, and mean-time-to-failure (MTTF) when using conventional data volumes. Those requirements are specific and different on a per-application, per user, per stored object/file/database table, per application-generated I/O workload. Moreover, those requirements tend to change dynamically, and often drastically, over time—with new users added, applications upgraded, hardware replaced, etc. Conventional data volumes do not support this rich and dynamic differentiation.

An HV resolves the problem by combining different storage media within the same HV to optimally support variety of applications with different requirements and, specifically, different needs with regards to capabilities of the underlying storage media. Application I/O requests may be matched to the underlying storage media—on a per application and per I/O basis, and processing those reads and writes according to the properties associated with the corresponding application-specific CoS labels.

On the other hand, the fact that heterogeneous storage systems include several subsystems with different properties introduces a new set of challenges. For instance, there is an increased possibility of internal performance imbalances that do not arise in conventional homogeneous systems. In particular, varying workloads or additional I/O processing stages combined with selective usage of CoS-matching storage tiers/disks may put more stress on those storage tiers/disks as compared to others. As a result, utilization of such tiers may increase beyond sustainable levels and performance of the system as a whole may suffer.

To demonstrate new challenges that HV configurations may inadvertently create, let's consider a couple examples. Consider a user requesting a data volume to store a number of files on a non-de-duplicated filesystem. To satisfy the request, storage administrator deploys HV and provisions a low-latency tier in this HV with a number of SSDs capable to sustain specific I/O-operations-per-second (IOPS) rates, specifically to store filesystem metadata ("metadata tier"). Further, let us assume the user then enables de-duplication on one of the existing filesystems or, alternatively, adds a new filesystem with de-duplication enabled. This causes significant increase of demand for metadata IOPS due to high rate of change of the de-duplication metadata which, along with the rest of filesystem metadata, is supposed to be placed on the metadata tier. In turn, this results in over-utilization of the metadata tier (which would become a bottleneck), and subsequently—in the overall HV performance drop.

Further, consider a given application that generates a workload that is split between two or more storage tiers of a given HV. Over time a disks in a given storage tier or one of its redundancy groups accumulates sector errors that ultimately start affecting this disk, and therefore, this tier's performance. Over time an application gets upgraded to a new version that results in generating significantly more load on one specific tier of the HV. Over time the number of users of this application increases to elevate the stress on one or more of the tiers to the extent that was not anticipated back at the time when this HV was deployed.

Any and all of the above, as well as many other real life scenarios, pose a difficult challenge: how to optimally load balance I/O operations between HV's storage tiers while abiding by the CoS matching rules. The present disclosure provides methods for overcoming this challenge.

Elastic I/O Processing Workflows

The present disclosure provides methods that track utilization of the key system components, as well as space usage and utilization of HV storage tiers. In addition, the methods may automatically re-balance loads imposed on the HV tiers by the varying workloads. These methods advantageously allow one to avoid situations when some key system components or HV tiers become performance bottlenecks.

The present invention provides very flexible and highly configurable system-defined write and read operations that allow for performance optimization. An embodiment of the present invention goes substantially beyond prior methods and it takes into account space usage statistics and utilization of HV storage tiers so as to optimize performance. In an exemplary implementation, performance optimization may be achieved using COST( ) and OPT( ) functions as described further below. Note that strict matching rules, if any, may take precedence over the optimizing procedures disclosed herein.

Furthermore, in accordance with an embodiment of the invention, a "minimal CoS" label may be used. The minimal CoS label may be, optionally, assigned to each I/O request. The minimal CoS label may be used to prevent dispatch of the I/O request to any tier whose CoS is lower that the specified minimal CoS. (Note that, in the 4-tiers examples above, tier 1 would be considered the highest or primary tier, and tier 4 would be considered the lowest.) For instance, if a tier becomes overloaded, the data destined for that tier may be placed on a lower tier if the lower tier is at or above the minimal CoS. If a tier with the CoS at or above the minimal CoS cannot be found, the request is not dispatched, and the upper layer is notified that the I/O request cannot be carried out with the requested range of CoS at present. This technique of matching I/O requests to HV tiers may be referred to as a "best-effort matching" method.

In accordance with an embodiment of the invention, under the best-effort matching method, I/O requests labeled with a CoS label (and optionally a minimal CoS label) that do not have their mapping to disk CoS configured, as well as I/O requests with no CoS label specified, may be assumed to be labeled with a default CoS label such that the best effort match may be applied. The default CoS label may be configured using, for example, a Storage Management System (SMS), which is well known in the art, or using other technologies, to specify the default configuration while at the same time providing the capability to override the default configuration. The default configuration may be overridden on a per application basis, per user basis, per stored object or file basis, per I/O request basis, and so on.

Additionally, in accordance with an embodiment of the invention, some I/O requests may bypass certain I/O processing stages that directly contribute to the increased utilization of system components. The I/O processing stages that increase utilization of certain system components may include, for example, data compression, encryption, de-duplication and checksumming (i.e., calculating checksums to protect user data). In order to avoid or circumvent the associated bottlenecks and imbalances, the presently-disclosed methods may perform some of these optional I/O processing stages only on some of the I/O requests and not the others.

For example, consider a system that stores de-duplication metadata on a designated tier X of the HV. In such a system, the utilization of this tier X may be continuously monitored. While the utilization is well below a pre-configured threshold (for example, a maximum fraction or percentage of utilization), then de-duplication may be applied to all of the new data that is being written to the volume. However, so as to keep utilization below the threshold, de-duplication may be applied to only part (for example, a certain fraction or percentage) of the written data if the utilization approaches (or exceeds) the threshold. This advantageously avoids the de-duplication feature from becoming a bottleneck that would otherwise degrade the HV's performance as a whole.

In accordance with an embodiment of the invention, in order to efficiently determine which specific additional processing is needed for an I/O request as discussed above, a "service label" may be provided with each I/O request that specifies these additional stages for an I/O request. The service label may be used to change the I/O processing workflow for a given request. For example, the service label may be changed in order to add or remove the corresponding processing stages in the I/O processing workflow for the request in question.

During the intervals of time when system resources are underutilized, an embodiment of the invention may "fall back" to a "static" mode of operation where a data write may be performed to a class of storage tier that matches a data write request. When the utilization of a monitored component (for instance, disks of the HV) crosses a relevant threshold, embodiments of the presently-disclosed invention enter an "elastic" mode which acts to prevent the associated bottlenecks by changing I/O workflows on the fly, at runtime, within the allowed limits. Those runtime changes applied to the workflows make them more dynamic in nature, i.e. the changes make the workflows "elastic".

The present disclosure introduces and discloses elastic I/O processing workflows. In an elastic I/O processing workflow, changes may be applied to the workflow—dynamically, at runtime. These changes may fall into two general categories:

(1) adjustments to I/O routing to/from class of storage tiers (and hence to/from the redundancy groups therein and the contained disks in the redundancy groups); and
(2) skipping optional (that is, non-mandatory) I/O processing stages.

When performing on-the-fly changes of I/O workflow to optimize a heterogeneous data volume's performance, an embodiment of the present invention may make a best effort of preserving and satisfying the matching of the implicitly or explicitly defined CoS labels of the I/O requests to the underlying classes of storage (i.e. to the disk CoS).

System Description

As discussed above, a heterogeneous data volume may be organized as a collection of classes of storage, each including a collection of possibly heterogeneous devices organized in one or more redundancy groups. Specific data/metadata types may be mapped to specified classes of storage of the underlying storage media (i.e. to the disk CoS). Such mapping and other required configuration (including redundancy groups and preferred read weights) may be done in a variety of conventional ways. For instance, a dedicated Storage Management System (SMS) may be used to allow system and storage administrators configure all, or a subset of, the required configuration variables.

Figure 4:
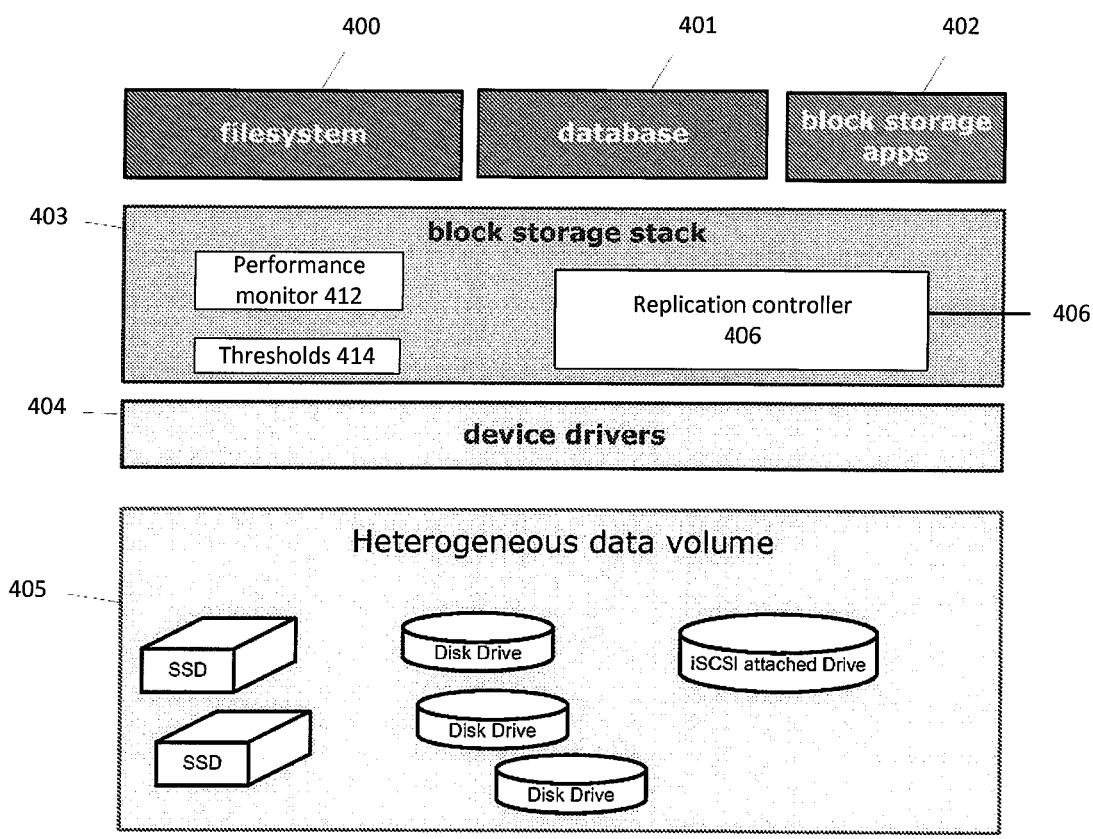
FIG. 4 depicts a first exemplary data storage system in accordance with an embodiment of the invention.
Figure 5:
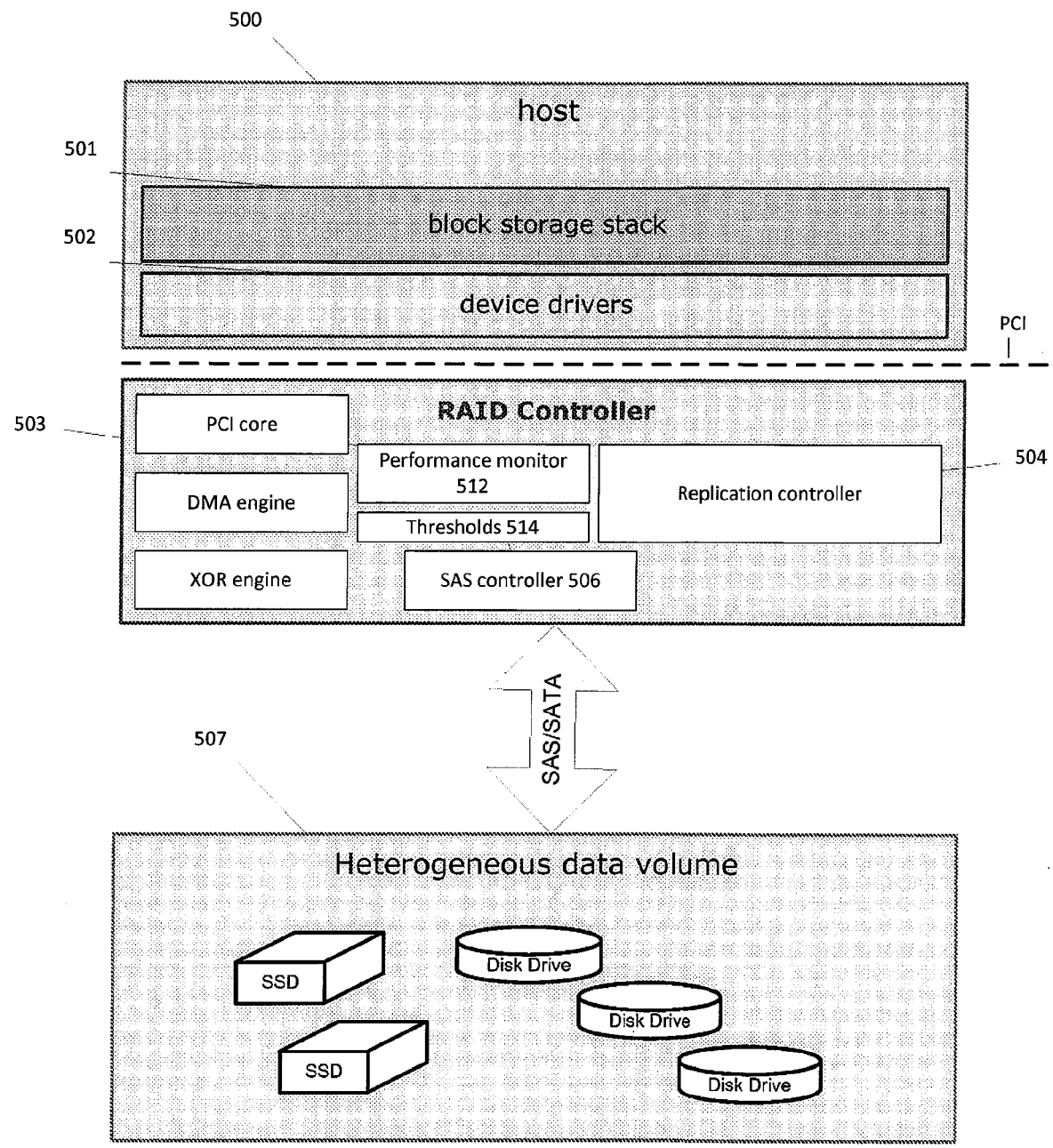
FIG. 5 depicts a second exemplary data storage system in accordance with an embodiment of the invention.
Figure 6:
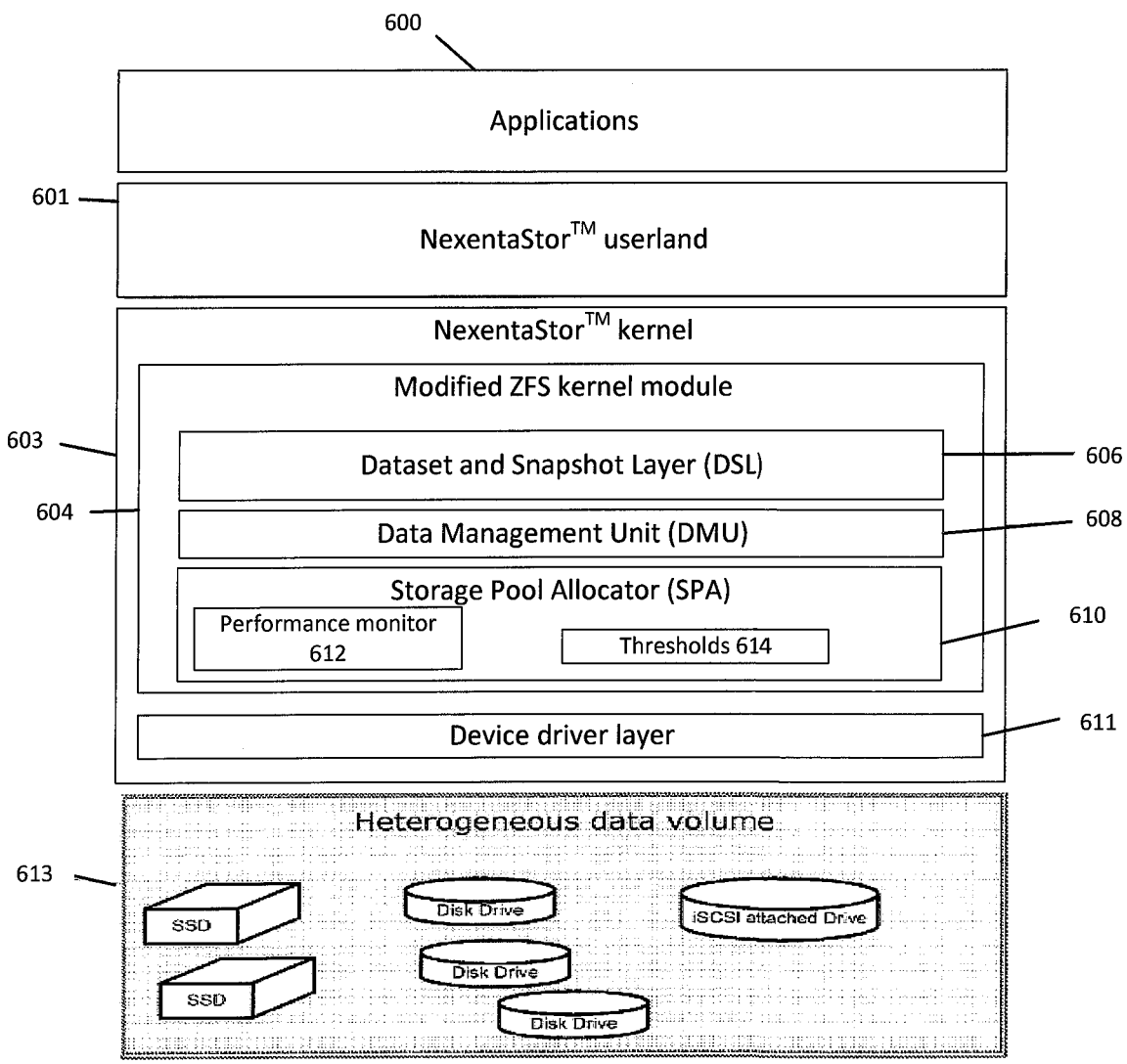
FIG. 6 depicts a third exemplary data storage system in accordance with an embodiment of the invention.

FIGS. 4, 5 and 6 depict exemplary data storage system structures in accordance with embodiments of the present invention.

The system structure of FIG. 4 illustrates a filesystem 400, database engine 401 and other block storage applications 402 that interact with the block storage stack 403. The block storage stack 403 may include a replication controller 406 which may provide both the conventional replication schemes as well as the enhanced replication schemes to support the heterogeneous data volume 405. The block storage stack 403 uses device drivers 404 to control storage inter-connects (SAS, SATA, FC, FCoE, iSCSI, USB, etc.) and interface with a heterogeneous data volume (i.e. a heterogeneous storage array) 405.

In accordance with an embodiment of the invention, the block storage stack 403 may further include a performance monitor 412 and threshold data 414. The performance monitor 412 and the threshold data 414 may be utilized by the replication controller 406 to provide elastic I/O processing workflows for the heterogeneous data volume 405 as disclosed herein.

The system structure of FIG. 5 includes a host 500, a RAID controller 503 and a heterogeneous storage array 507 connected to the RAID controller 503. The RAID controller 503 provides for the RAID logic that supports conventional RAID schemes and the advanced heterogeneous RAID schemes in accordance with the present invention. The RAID controller 503 may also include various other modules, such as, for example, a PCI core, a DMA engine, and an XOR engine. The host may run an operating system that includes block storage stack 501 that in turn uses the device drivers 502 to interface with the RAID controller 503.

The RAID controller 503 may interface with the heterogeneous data volume 507 via SAS, SATA, FC, FCoE, iSCSI and other compliant storage inter-connects managed by the corresponding modules (for instance, SAS controller 506 shown in FIG. 5) within the RAID controller itself. The SAS controller 506 will provide attachment to SAS and SATA drives; more than a single type of transport controller may be added to provide for multiple I/O access mechanisms.

The RAID controller 503 may include a replication controller 504. The replication controller 504 may provide both the conventional replication schemes as well as the enhanced replication schemes to support the heterogeneous data volume 507.

In accordance with an embodiment of the invention, the RAID controller 503 may further include a performance monitor 512 and threshold data 514. The performance monitor 512 and the threshold data 514 may be utilized by the replication controller 504 to provide elastic I/O processing workflows for the heterogeneous data volume 507 as disclosed herein.

FIG. 6 illustrates a system structure wherein a ZFS module within NexentaStor™ is modified in accordance with an embodiment of the present invention. NexentaStor™ is a proprietary storage appliance that is based on open-source Nexenta Operating System. NexentaStor™ userland 601 includes modified ZFS management commands and libraries to manage the heterogeneous data volume 613. Applications 600 may utilize the modified ZFS management commands and libraries of the NexentaStore userland 601.

In this structure, the NexentaStor™ kernel 603 includes a modified ZFS kernel module 604 that in turn provides support for heterogeneous data volume 613. As shown, a dataset and snapshot layer (DSL) 606 may be modified to assign, reassign, clear, and propagate via inheritance classes of storage for ZFS datasets and snapshots. In addition, a data management unit (DMU) layer 608 may handle all data and metadata objects as far as class of storage related processing is concerned. Furthermore, a storage pool allocator (SPA) layer 610 may be enhanced to support read preference logic, asynchronous writes and per class of storage data access mechanisms. The modified ZFS module 604 interfaces with the device driver layer 611 which in turn interfaces with the heterogeneous storage array 613 that contains disks of different classes of storage.

In accordance with an embodiment of the invention, the SPA 610 may further include a performance monitor 612 and threshold data 614. The performance monitor 612 and the threshold data 614 may be utilized by the SPA 610 to provide elastic I/O processing workflows for the heterogeneous data volume 613 as disclosed herein.

In each of the storage structures described above in relation to FIGS. 4 through 6, the performance monitor (412 or 512 or 612) and the thresholds (414 or 514 or 614) may track and evaluate various performance statistics within the heterogeneous data volume.

In an exemplary embodiment, the following performance statistics may be tracked: used space (statistic S1); moving average of disk utilization (statistic S2); and moving average of CPU utilization (statistic S3). S1 may be measured at redundancy group level, whereas S2 and S3 may be measured for the corresponding physical devices. Subsequently, S1 and S2 may be calculated for classes of storage and redundancy groups as known functions of the corresponding values for devices and redundancy groups. For instance, S1 (used space) for a class of storage is a maximum function of the S1 values for the redundancy groups, whereas S2 (disk utilization) for a redundancy group is an average function of the S2 values for the devices in the group, although the maximum function may also be a good choice depending on the storage tier organization and the optimization goals pursued by the system designer.

In this exemplary embodiment, the following thresholds may be stored and used: high and low watermarks for used space (parameters AH and AL); high and low watermarks for moving average of disk utilization (parameters BH and BL); and high and low watermarks of moving average of CPU utilization (parameters CH and CL). Further parameters may include weights (parameters D1 and D2) that may be used by a cost function to account for the statistics S1 and S2 when calculating the "cost" (in terms of used space and disk utilization) of an I/O request.

Note that the system may automatically assign default values to the threshold and weighting parameters, and therefore a storage management system (SMS) driven configuration may be optional. The SMS may also vary the parameters dynamically in order to achieve the desired ranges or component utilization. A particular embodiment of the system described in the present application is not required to use all the parameters described above, or may use additional parameters that suitably describe the specific storage tiers and subsystems.

Method Description

In accordance with an embodiment of the invention, an I/O processing subsystem for a heterogeneous data volume may include one or more of the methods disclosed herein. An exemplary I/O processing subsystem which may be modified to incorporate these methods is described in U.S. Patent Application Publication 2012/0017043 A1 ("Method and System for Heterogeneous Data Volume," inventors Alexander AIZMAN, et al.). The methods disclosed herein may also be incorporated into the I/O processing subsystems of other data storage systems.

The present application discloses various new functions for the I/O subsystem for a heterogeneous data volume. These functions include: an OPT( ) function that selects a class of storage tier for performing a data write request (see FIG. 7); a MODE( ) function that determines an operating mode of a class of storage tier (see FIG. 8); and a COST( ) function that selects a redundancy group within a selected class of storage tier (see block 908 in FIG. 9). The OPT( ) and COST( ) functions effectively refine the pre-configured mapping of I/O requests to classes of storage, redundancy groups, and devices, as well as to. I/O processing stages, if certain conditions are met, as described low.

In accordance with an embodiment of the invention, a new CoS label, called a "minimal CoS label", is optionally assigned to each I/O request. This label, when assigned, limits the choices of the target tier that the system is allowed to make. If the system cannot dispatch an I/O request to one of the tiers in the range designated by the minimal CoS and the requested CoS labels, then the request is not performed at all, and the upper layer is notified that the minimal CoS for this request cannot be satisfied at present.

Furthermore, in accordance with an embodiment of the invention, instead of associating additional I/O processing stages, such as encryption, compression, and de-duplication, with classes of storage, as in U.S. Patent Application Publication 2012/0017043 A1, the present application adds another new label, referred to as a "service label", to an I/O request. The service label is an I/O request label that specifies the additional processing stages that the I/O request is to undergo. In order to reconfigure the I/O processing workflow for a given I/O request, the service label attached to the I/O request is modified to include, or to exclude, additional processing stages.

Similar to mapping of I/O requests to classes of storage with CoS labels in I/O requests, an embodiment of the present invention assigns the responsibility of maintaining a mapping of I/O request labels to additional processing stages to the upper layers of software mentioned earlier. This allows the heterogeneous data volume to avoid maintaining extra state and to concentrate on carrying out the requested processing in the most efficient fashion.

Figure 7:
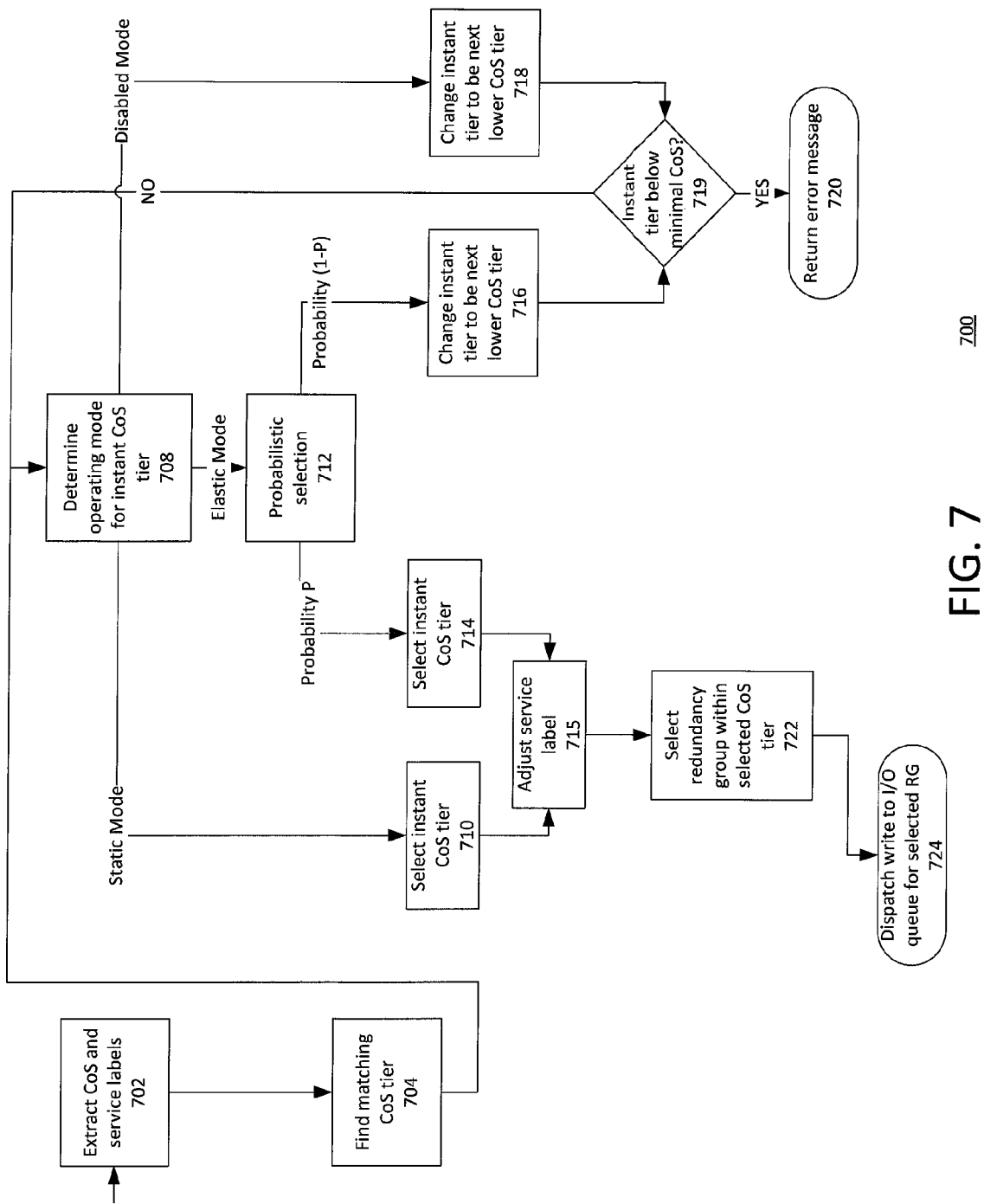
FIG. 7 is a flow chart of an exemplary method of selecting a class of storage tier for performing a data write request in accordance with an embodiment of the invention.

FIG. 7 is a flow chart of an exemplary method 700 of selecting a class of storage (CoS) tier for performing a data write request in accordance with an embodiment of the invention. In one embodiment, the method 700 of FIG. 7 may implement an OPT( ) function that is invoked for an I/O request. This OPT( ) function selects the CoS tier for a write request to the heterogeneous data volume.

In an exemplary implementation, the OPT( ) function takes the following arguments: i) a request type (read, write); ii) a request CoS label; iii) a reference to the HV monitoring facility that maintains various operating statistics for the HV; and iv) a reference to the HV configuration repository (perhaps SMS) that contains the low and high thresholds for the various classes of storage. The request type indicates whether the requested transaction is a read or a write. The request CoS label indicates the class of storage being requested for this transaction. For example, the operating statistics monitored by the HV monitoring facility may include statistics S1, S2 and S3, which may be monitored for each of the various classes of storage. In this example, the threshold AL and AH may be, respectively, the low and high thresholds for S1. Similarly, BL and BH may be the low and high thresholds for S2, and CL and CH may be the low and high thresholds for S3. The HV configuration repository may be maintained by a storage management system (SMS) and may contain the thresholds (for example, AL, AH, BL, BH, CL and CH) for the various classes of storage.

The OPT( ) function may return the destination storage class. In addition, as taught herein, the OPT( ) function may return an indication of which additional I/O processing steps (e.g. compression, encryption, de-duplication) are to be performed on this I/O request.

The OPT( ) function may be invoked when an I/O request is received. The flow chart of FIG. 7 shows an exemplary method 700 that may be used by the OPT( ) function to perform a data write to a heterogeneous data volume. Upon receiving a data write request, the method 700 of FIG. 7 may be performed.

Per block 702, a class of storage (CoS) label and a service label may be extracted from the data write request. Per block 704, the CoS label may be consulted to determine which CoS tier of the HV matches the CoS requested. This determination may be made according to pre-configured mappings. The CoS tier instance (i.e. the CoS tier under consideration) may be set initially to be the matching CoS tier.

Per block 708, a determination may be made as to the operating mode for the CoS tier instance. In accordance with an embodiment of the invention, the operating mode may be determined to be one mode of a set of modes, where the set of modes consists of a static mode, an elastic mode, and a disabled mode. In one implementation, the determination of the operating mode may be accomplished using the procedure 800 of FIG. 8, which is described below.

If the operating mode of the CoS tier instance is determined to be the static mode in block 708, then the method 700 proceeds to block 710. Per block 710, the CoS tier instance under consideration is selected to be the CoS tier for the data write. After block 710, the method 700 may move forward to block 715.

Per block 715, a procedure may be performed to adjust the service label. The service label may be adjusted to reduce services performed for the data write depending on the operating conditions of the selected CoS tier. In one implementation, adjustment of the service label may be accomplished using the procedure 1000 of FIG. 10, which is described below.

After block 715, a selection is made of a redundancy group within the selected CoS tier per block 722. In one implementation, the selection of the redundancy group within the selected CoS tier may be accomplished using the procedure 900 of FIG. 9, which is described below. Thereafter, per block 724, the data write may be dispatched to the I/O queue for the selected redundancy group.

If the operating mode of the CoS tier instance is determined to be the elastic mode in block 708, then the method 700 proceeds to block 712. Per block 712, a probabilistic selection is made, where there is a probability P (in a range from 0 to 1) for selecting the CoS tier instance. In particular, as shown in FIG. 7, there is a probability P that the method 700 moves forward to block 714 and a probability (1-P) that the method 700 goes to block 716. In one implementation, P may be a function of S1, S2, AH, BH, and it may progressively reduced as S1, S2 approach AH, BH. The probabilistic selection may be performed by generating a random uniformly distributed number from 0 to 1, and selecting the instant CoS if the random number is within the range from 0 to P.

Per block 714, the CoS tier instance under consideration is selected to be the CoS tier for the data write. Thereafter, the procedure may move forward to blocks 715, 722 and 724, as described above.

Per block 716, the CoS tier instance is changed to be the next lower service tier (i.e. the next higher number tier). For example, if the CoS tier instance is Tier 2 (non-mission critical applications), then the CoS tier instance may be changed to Tier 3 (hourly and daily back-ups). After block 716, the method 700 goes to block 719.

Finally, if the operating mode of the CoS tier instance is determined to be the disabled mode in block 708, then the method 700 also proceeds, after changing the CoS tier instance to be the next lower CoS tier per block 718, to block 719.

Per block 719, a determination is made to see if the CoS tier instance is now below the minimal CoS as may be specified by the minimal CoS label of the I/O request. If the CoS tier instance is below (worse than) the minimal CoS, then an error message may be returned per block 720. The error message may indicate that the minimal class of storage cannot be met. If the CoS tier instance is at or above (at or better than) the minimal CoS, then the method 700 may loop back to block 708.

Figure 8:
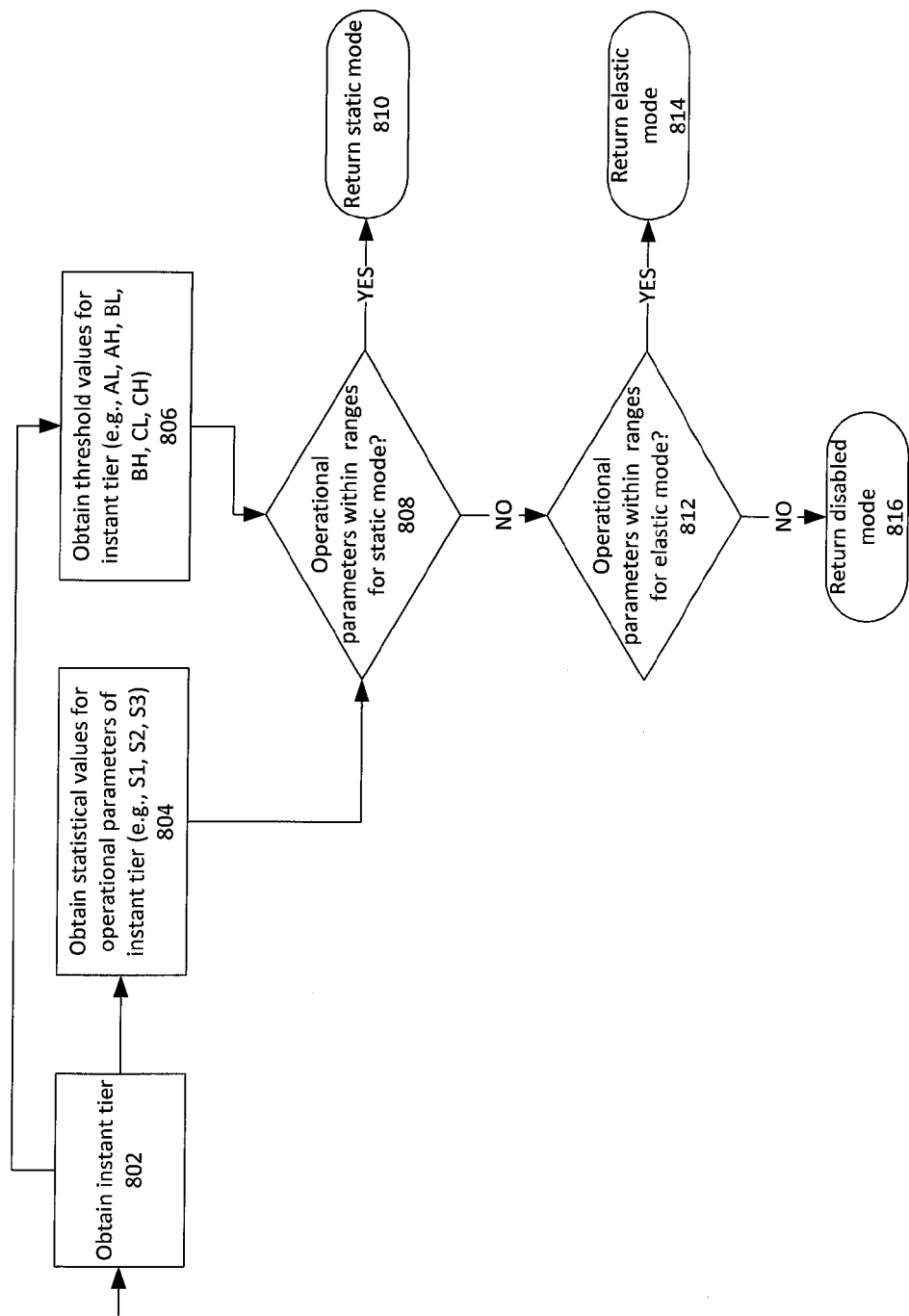
FIG. 8 is a flow chart of an exemplary procedure of determining an operating mode of a class of storage tier in accordance with an embodiment of the invention.

FIG. 8 is a flow chart of an exemplary procedure 800 of determining an operating mode of a class of storage tier in accordance with an embodiment of the invention. This procedure 800 may be implemented as a MODE( ) function that returns the operating mode for a particular CoS tier. As described above, in one implementation, the MODE( ) function may be called at block 708 in the method 700 of FIG. 7.

In accordance with an embodiment of the invention, a storage tier may operate in three operational modes: (i) static I/O processing workflow mode; (ii) elastic I/O processing workflow mode; and (iii) disabled mode. The MODE( ) function returns the operational mode for a storage tier.

The MODE( ) function may take as arguments the statistics (e.g., S1, S2, and S3), and the threshold values (e.g., AL, AH, BL, BH, CL, and CH) for a given class of storage. The MODE( ) function then returns the operational mode for a storage tier.

As an example, consider the following algorithm for determining the operational mode for a storage tier: the Static mode is in effect when the system operates within the expected operational parameters (S1<AL and S2<BL and S3<CL); the Elastic mode is in effect when one or more operational parameters exceed their expected values (S1>=AL and S1<AH, or S2>=BL and S2<BH, or S3>=CL and S3<CH); and the Disabled mode is entered under conditions of overload, where one or more parameters go above high watermarks (S1>AH or S2>BH or S3>CH). A procedure 800 implementing this exemplary MODE( ) function is shown in FIG. 8.

Per block 802, the CoS tier instance under consideration may be obtained from the arguments of the call to the MODE( ) function. It is for this instant tier that the operational mode will be determined.

Per block 804, the statistical values for the operational parameters of the instant tier may be obtained from the arguments of the call to the MODE( ) function. In one implementation, the tier-level statistical values for the operational parameters may include S1, S2 and S3, where S1 provides a measure of used space, S2 provides a moving average of disk utilization, and S3 provides a moving average of CPU utilization.

Per block 806, the threshold values for the instant tier may be obtained from the arguments of the call to the MODE( ) function. In one implementation, the threshold values may include AL, AH, BL, BH, CL, and CH, where AL and AH are respectively low and high watermarks for S1, BL and BH are respectively low and high watermarks for S2, and CL and CH are respectively low and high watermarks for S3.

Per block 808, a determination may be made as to whether the statistical values of the operational parameters S1, S2, and S3 are within predetermined ranges for a static mode. In one implementation, the static mode is maintained so long as the statistical values of all the operational parameters remain within their expected ranges, i.e. so long as S1<AL and S2<BL and S3<CL.

Per block 810, a determination may be made as to whether the statistical values of the operational parameters (e.g., S1, S2, and S3) are within predetermined ranges for an elastic mode. In one implementation, the elastic mode is in effect when one or more operational parameters exceed their expected values though remain under overload conditions, i.e. if S1>=AL and S1<AH, or S2>=BL and S2<BH, or S3>=CL and S3<CH.

Per block 812, if the statistical values of the operational parameters S1, S2, and S3 are outside of the predetermined ranges for the static and elastic modes, then the operational mode may be deemed to be a disabled mode. In one implementation, the disabled mode is entered when one or more parameters go above their corresponding high watermarks (which indicate overload), i.e. if S1>AH or S2>BH or S3>CH.

Figure 9:
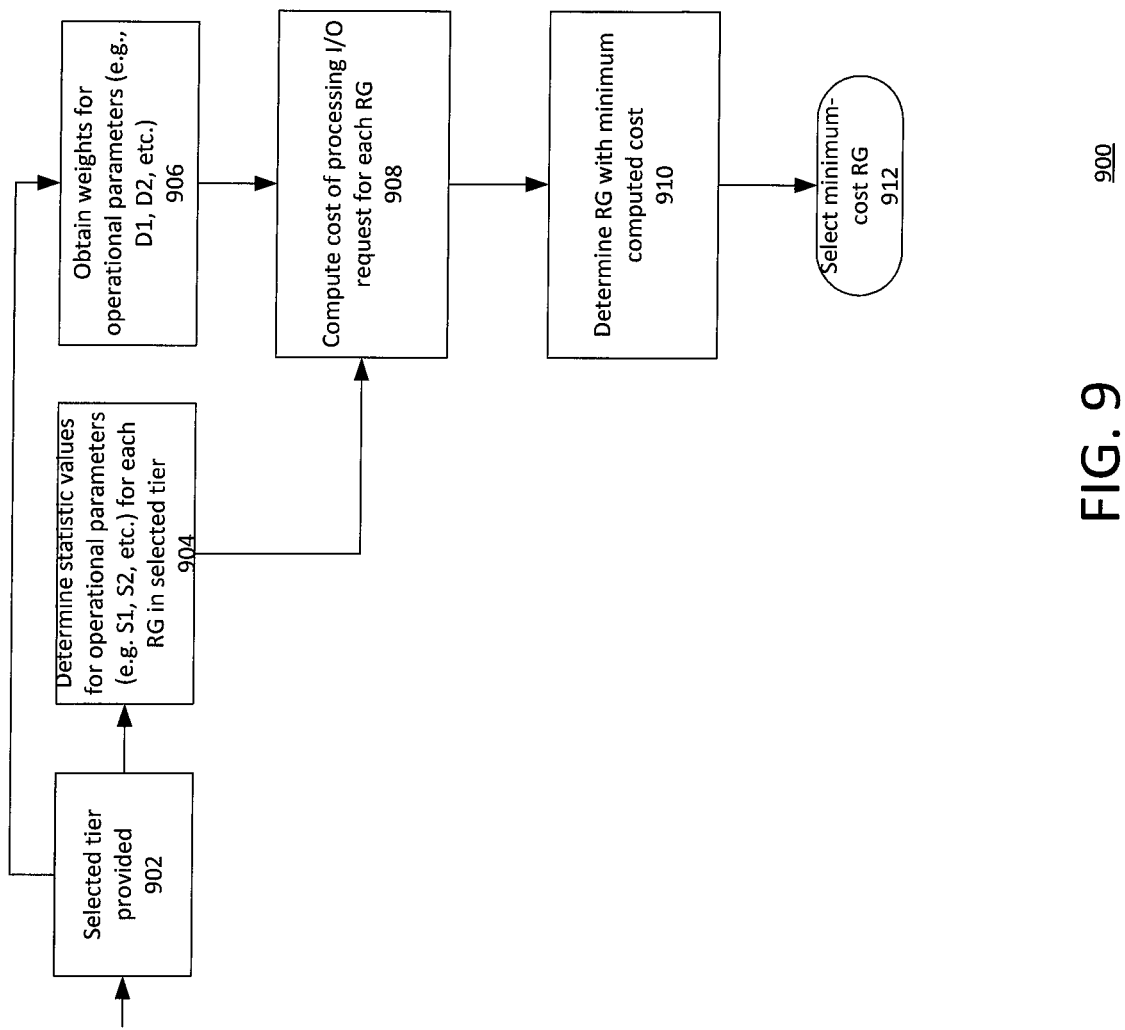
FIG. 9 is a flow chart of an exemplary procedure for selecting a redundancy group within a selected class of storage tier in accordance with an embodiment of the invention.

FIG. 9 is a flow chart of an exemplary cost-based procedure 900 for selecting a redundancy group within a selected class of storage tier in accordance with an embodiment of the invention. As described above, in one implementation the cost-based procedure 900 of FIG. 9 may be used at block 722 in the method 700 of FIG. 7.

Per block 902, the selected CoS tier may be provided. It is for this selected CoS tier that the cost for the data write is to be computed. In the method 700 of FIG. 7, the selected CoS tier may be chosen in either block 710 (static mode) or block 714 (elastic mode).

Per block 904, a determination may be made as to group-level statistical values for operational parameters for each redundancy group (RG) within the selected CoS tier. In one implementation, the group-level statistical values for the operational parameters may include S1 and S2 for each RG, where S1 provides a measure of used space for the RG, and S2 provides a moving average of disk utilization for the RG.

Per block 906, the weights for the statistics may be obtained. In one implementation, the weights may include D1 and D2, where D1 is the weight for S1, and D2 is the weight for S2. In one implementation, the weights may be pre-configured and may be the same for each RG.

Per block 908, the "cost" (in terms of disk space and disk utilization) for the data write may be computed for each RG in the selected tier. This may involve calling a COST( ) function for each RG. In one implementation, the cost may be computed for each RG as a weighted sum as follows: COST(S1, S2,D1,D2)=D1*S1+D2*S2, where S1 and S2 may be specific to the RG.

Per block 910, the RG with the minimum computed cost may be determined. Finally, per block 912, the minimum-cost RG may be selected. Subsequently, as described above in relation to block 724 in FIG. 7, the data write may be dispatched to the I/O queue for this selected (minimum-cost) RG.

As described above, the cost-based procedure 900 of FIG. 9 may call a COST( ) function in block 908 that computes a "cost" in resources of a data write using system statistics and weightings for those statistics. The COST( ) function may take as arguments redundancy-group-level or device-level statistics (e.g. S1, S2) and the pre-configured weights for those statistics (e.g., D1, D2). The COST( ) function may return the calculated cost of I/O request processing.

Storage Services in HV

Compression and de-duplication may be considered additional service provided by HV. In accordance with an embodiment of the invention, I/O requests may carry an indication that such services are requested in their service label as described above. Fulfillment of these service requests involves additional load on specific subsystems and storage tiers.

The desired response to the additional load imposed by such service differs from the generic I/O request (without additional services). Instead of re-distributing the load across CoS tiers, the method disclosed herein omits applying such services to some I/O requests if the corresponding subsystems or storage tiers become overloaded. This advantageously results in reduction of load on the system and counteracts the drop of the system performance.

For instance, compression often results in additional CPU load. In the technique taught herein, this increase may be moderated by skipping the compression step in the I/O processing workflow for some of I/O requests that otherwise would be compressed.

As another example, de-duplication often generates a special type of metadata that is stored in storage tiers with low access latency. The additional I/O load imposed on these tiers by the de-duplication processing may be significant. However, the technique disclosed herein may be used to reduce the effective de-duplication rates by skipping the de-duplication service for some of the I/O requests, even though that additional service was requested.

Figure 10:
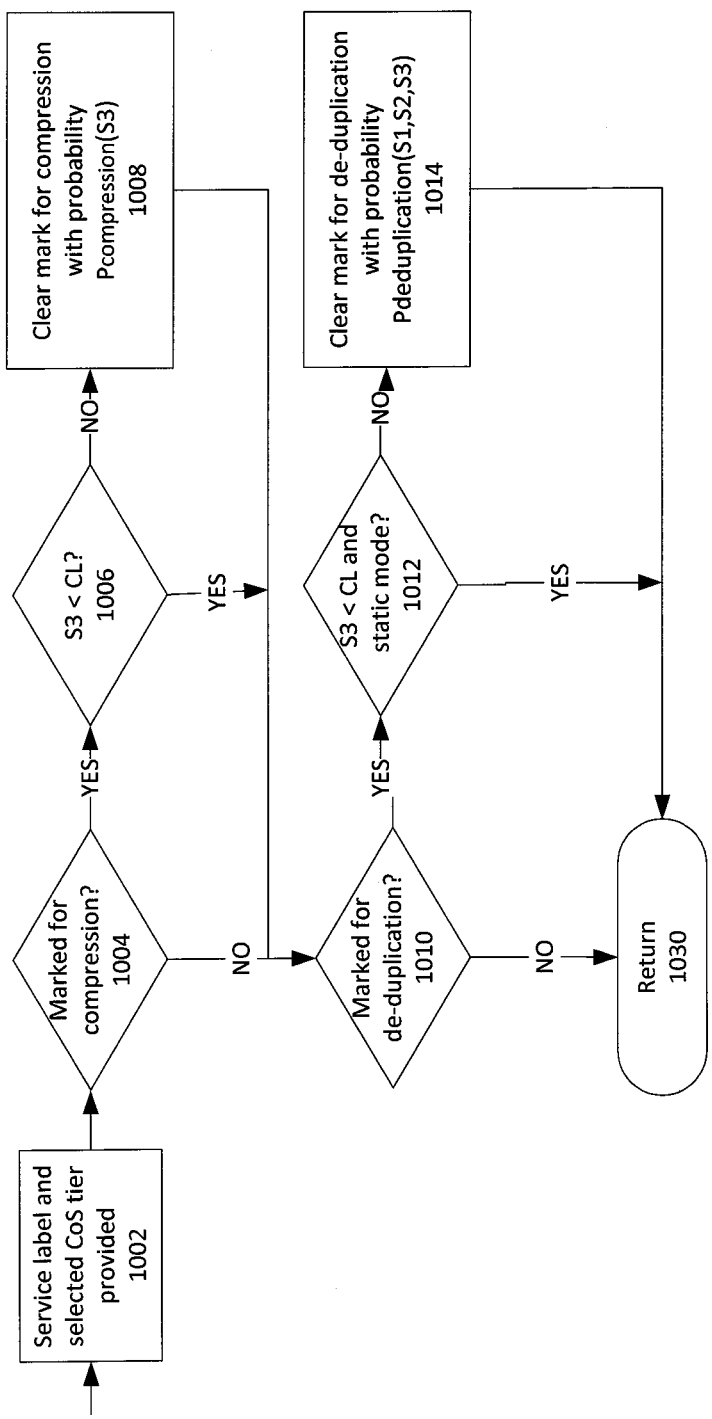
FIG. 10 is a flow chart of an exemplary procedure for determining and making changes, if any, to a service label in accordance with an embodiment of the invention.

FIG. 10 is a flow chart of an exemplary procedure 1000 for determining and making changes, if any, to a service label in accordance with an embodiment of the invention. As described above, in one implementation, the procedure 1000 of FIG. 10 may be used at block 715 in the method 700 of FIG. 7.

Per block 1002, the service label and the selected CoS tier may be provided. The service label may have been extracted from the I/O request, and the selected CoS tier may be chosen in block 714 (elastic mode).

Per block 1004, a determination may be made as to whether the service label for the data write is marked for compression. If the service label is not marked for compression, then the procedure 1000 may move forward to block 1010, else a further determination may be made per block 1006 as to whether the statistic S3 (CPU utilization) is less than the corresponding low watermark threshold value CL (i.e. if S3<CL).

If block 1006 determines that S3<CL, then the compression label remains marked and the procedure 1000 may move forward to block 1010, else the mark may be cleared with probability $P_{compression}$ according to block 1008. In other words, there is a probability $P_{compression}$ that the mark is cleared, and a probability (1-$P_{compression}$) that the mark remains set. If the compression mark is cleared, then compression will not be performed for this data write, despite the original service label attached to the I/O request being marked for compression. In one implementation, the probability $P_{compression}$ may be a pre-configured function of S3, CL and CH such that $P_{compression}=0$ if S3<=CL and $P_{compression}=1$ if S3>=CH. For example, $P_{compression}$ may be a linear function of CL, such as, for instance, $P_{compression}$(S3, CL, CH)=(S3−CL)/(CH−CL), where S3 is in a range from CL to CH. After block 1008, the procedure 1000 may move forward to block 1010.

Per block 1010, a determination may be made as to whether the service label for the data write is marked for de-duplication. If the service label is not marked for de-duplication, then the procedure 1000 may return to the calling procedure per block 1030, else a further determination may be made per block 1012 as to whether the statistic S3 (CPU utilization) is less than the corresponding low watermark threshold value CL (i.e. if S3<CL) and whether the operating mode for the selected CoS tier is the static mode.

If block 1012 determines that S3<CL and the operating mode is the static mode, then the de-duplication label remains marked and the procedure 1000 may return to the calling procedure per block 1030, else the mark may be cleared with probability $P_{de-duplication}$ per block 1014. If the de-duplication mark is cleared, then de-duplication will not be performed for this data write, despite the original service label attached to the I/O request being marked for de-duplication.

In performing block 1014, there is a probability $P_{de-duplication}$ that the mark is cleared, and a probability (1-$P_{de-duplication}$) that the mark remains set. In one implementation, the probability $P_{de-duplication}$ may be a pre-configured function of the statistics S1, S2, S3 for the selected CoS tier and also of the corresponding thresholds AL, AH, BL, BH, CL and CH. In particular, $P_{de-duplication}$ may progressively increase as S3 approaches CH and as S1 and S2 approach AH and BH, respectively, such that $P_{de-duplication}$ is 100% when either S3>=CH, or S1>=AH and S2>=BH. After block 1014, procedure 1000 may return to the calling procedure per block 1030.

The above-described exemplary procedure 1000 may be used to address load imbalances caused by the storage service processing. In particular, the procedure 1000 may be used to address load imbalances relating to elastic I/O workflow for compression and de-duplication.

Figure 11A:
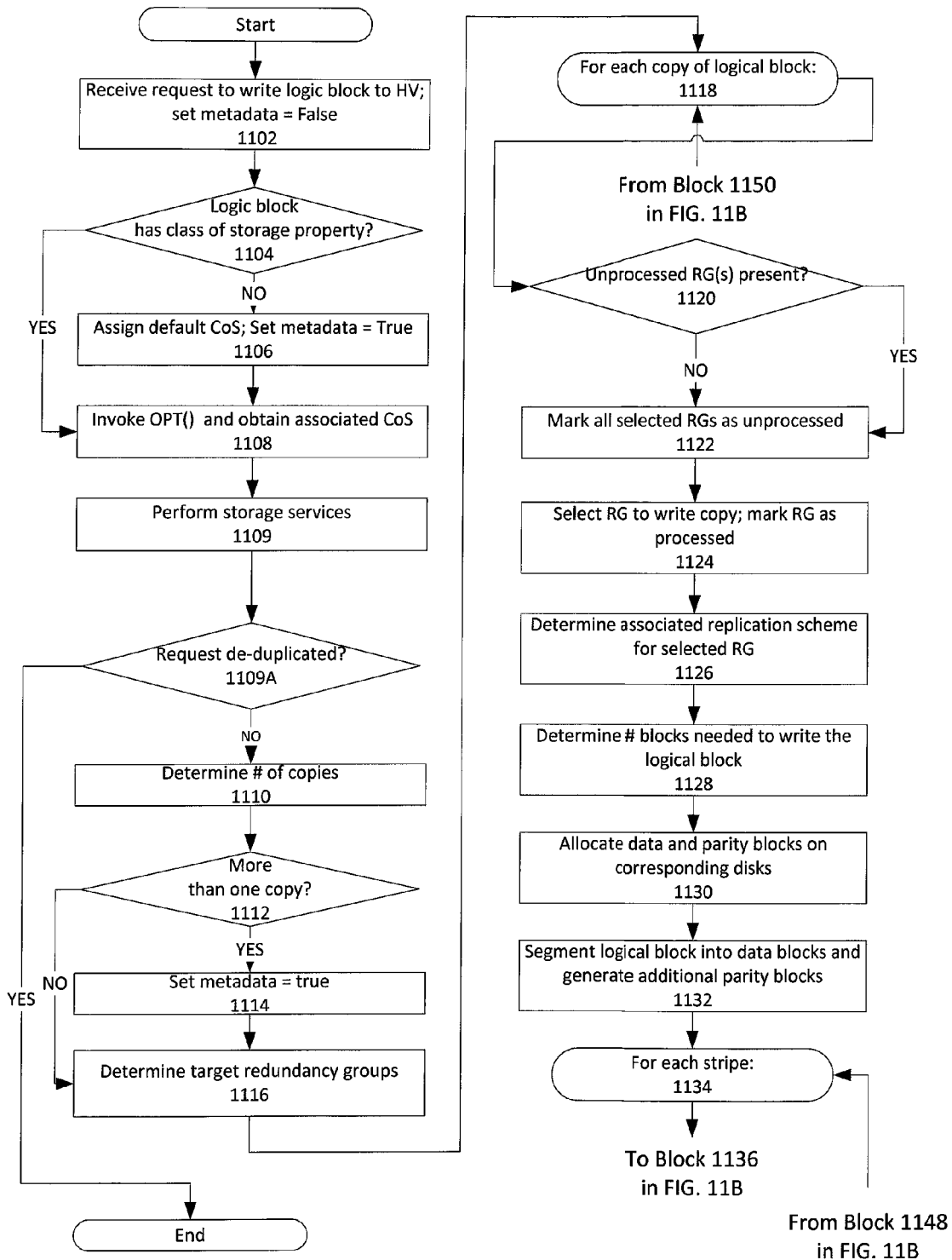
FIG. 11, composed of FIG. 11A and FIG. 11B, shows a flow chart of an exemplary procedure to write a logical block to a heterogeneous data volume in accordance with an embodiment of the invention.

FIG. 11, composed of FIG. 11A and FIG. 11B, shows a flow chart of an exemplary procedure to write a logical block to a heterogeneous data volume in accordance with an embodiment of the invention. Initially, per block 1102, a request for writing a logical block is received, and a metadata flag may be set to False.

Next, per block 1104, a check for a class of storage associated with the logical block is made. If the application that uses data volume to store/retrieve data is not heterogeneous data volume aware, the logical block will not be associated with any class of storage. If logical block is not associated with any class of storage, then, per block 1106, a default class of storage is assigned to the logical block, and the metadata flag may be set to True. The default class of storage may be determined by the predefined management policies set by the administrator or by the SMS with regard to the application that initiates the write request. The metadata flag being set to True indicates that the data volume stores certain extra information (i.e. metadata) regarding this data block because the application is not heterogeneous data volume aware.

If the application is heterogeneous data volume aware, then the logical block may be associated with a class of storage. If so, them, per block 1108, the associated class of storage tier may be obtained by invoking the OPT( ) function. The latter invocation of OPT( ) may also result in adjustment of the service label.

Next, per block 1109, storage services (e.g. compression and de-duplication) may be performed according to the request service label. The optionally transformed logical block is used in subsequent operations, unless it is de-duplicated (i.e. it is determined that there is already a duplicate copy of the logical block stored in the system) per block 1109A, in which case, the request is deemed complete at this point.

Next, per block 1110, the number of copies for the logical block may be determined based on its class of storage property. Per block 1112, if the class of storage property for this logical block specifies more than one copy, the details of extra copy need to be maintained in the metadata. Hence, a requirement for metadata is flagged, via block 1114, if the check for more than one copy, via block 1112, is true.

Next, per block 1116, the target redundancy groups for storing this logical block may be determined by matching the class of storage of the logical block and classes of storage of redundancy groups. In one embodiment, this is performed by bitwise AND-ing the class of storage of logical block and the class of storage of each redundancy group. Once the redundancy groups for this logical block are selected, all the selected (target) redundancy groups are marked as unprocessed. All the copies for this logical block have to be accommodated in the selected set of redundancy groups.

Per block 1118, for each copy of the logical block as required by the class of storage, the procedural steps given by blocks 1120 through 1148 may be performed. Per block 1150, if a next copy of the logical block remains to be written, then the procedure 1100 loops back to block 1120 to write the next copy.

Per block 1120, a determination may be made as to whether unprocessed redundancy group(s) is (are) present for the specified class of storage. If no unprocessed redundancy group is present, then all the selected (target) redundancy groups are marked as unprocessed per block 1122. If one or more unprocessed redundancy group is present, then the procedure moves forward to block 1124.

Per block 1124, from the set of unprocessed redundancy groups for the specified class of storage, a redundancy group is selected to write the copy of the logical block, and the selected redundancy group is marked as processed. In one embodiment, the selection of the redundancy group is performed by determining the pending I/O operations on the selected unprocessed redundancy groups, and then selecting the redundancy group with the least pending number of I/O operations. This logic evenly distributes I/O operations across the redundancy groups and their storage disks.

Once a target redundancy group for the copy of the logical block is selected, replication scheme of the redundancy group is determined per block 1126. In addition, the number of blocks needed to store this copy is determined based on the replication scheme and size of the logical block per block 1128. Data and parity blocks may be allocated on the disks of the redundancy group per block 1130. Further, the logical block may be segmented into data blocks, and additional parity blocks may be calculated, if needed, based on the replication scheme per block 1132.

Each data block may then be written to the corresponding storage disks. Per block 1134, for each strip consisting of data and parity blocks, the procedural steps given by blocks 1136 through 1146 may be performed. Per block 1148, if a next stripe of the copy remains to be written, then the procedure 1100 loops back to block 1134 to write the next stripe.

Based on the associated class of storage and its properties, the write operation may be synchronous or asynchronous. Per block 1136, a determination may be made as to whether the write is to be synchronous or asynchronous. Per block 1138, the procedure 1100 goes to block 1140 for a synchronous write and to block 1142 for an asynchronous write.

If the write is to be synchronous, then, per block 1140, the write operation for the current stripe is issued to the disk using the data writing mechanism specific to the class of storage of the disk to be written. In addition, the write request from the caller is blocked until the write operation has made it to the disk. On the other hand, if the write operation for the current stripe is to be asynchronous, then, per block 1142, the write operation is scheduled using the data writing mechanism specific to the class of storage of the disk to be written, and control is returned back to the caller.

Note that, before the data block is written to the disk, operations are performed on the data block based on the attributes of the class of storage associated with the disk. For instance, data block is compressed using gzip algorithm if the compression attribute of the class of storage associated with the disk is set to gzip.

Next, a determination is made, per block 1144, as to whether the requirement for metadata was flagged previously for this logic block (i.e. whether the metadata flag is set to True). If a requirement for metadata was flagged previously for this logical block, then the logical block's metadata is updated with the physical location of the written stripe per block 1146.

Per block 1148, if one or more stripes of the copy are still to be written, then the procedure 1100 selects a next strip and loops back to block 1134. Once all the stripes for the copy are written, then, per block 1150, if one or more copies of the logical block are still to be written, then the procedure 1100 selects a next copy and loops back to block 1118.

Once all the copies of the logic block are written, then, per block 1152, a determination may be made as to whether the requirement for metadata was flagged previously for this logic block (i.e. whether the metadata flag is set to True). If so, then, the metadata associated with this logical block is written to the metadata store per block 1154.

Note that the algorithm illustrated in FIG. 11 is recursive in accordance with the recursive definition of the redundancy group. Each write operation initiated in any redundancy group that comprises one or more redundancy groups is processed recursively in accordance with the same algorithm illustrated on FIG. 11.

Read Requests

The above description focuses on an I/O request that is a data write request. For an I/O request that is a data read request, the class of storage and device to read from may be selected as follows:

a) The I/O address may be examined, and the corresponding CoS and redundancy group may be selected based on the I/O address; and b) The redundancy group information may be examined, and a determination may be made based on that information as to which collection of physical devices (for example, in the case of mirror redundancy) or subgroups of physical devices (for example, in the case of RAID) contain the data to be read.

If there is only one device or subgroup of devices that contains the requested data, then the device or subgroup is selected.

If there are multiple devices or subgroups that contain the requested data, then the COST( ) function may be invoked for each device with per-device statistics S1 and S2. In one implementation, the cost for a subgroup may be taken as the maximum per-device cost of the devices in the subgroup. The device or subgroup with the lowest cost may then be selected.

Figure 12A:
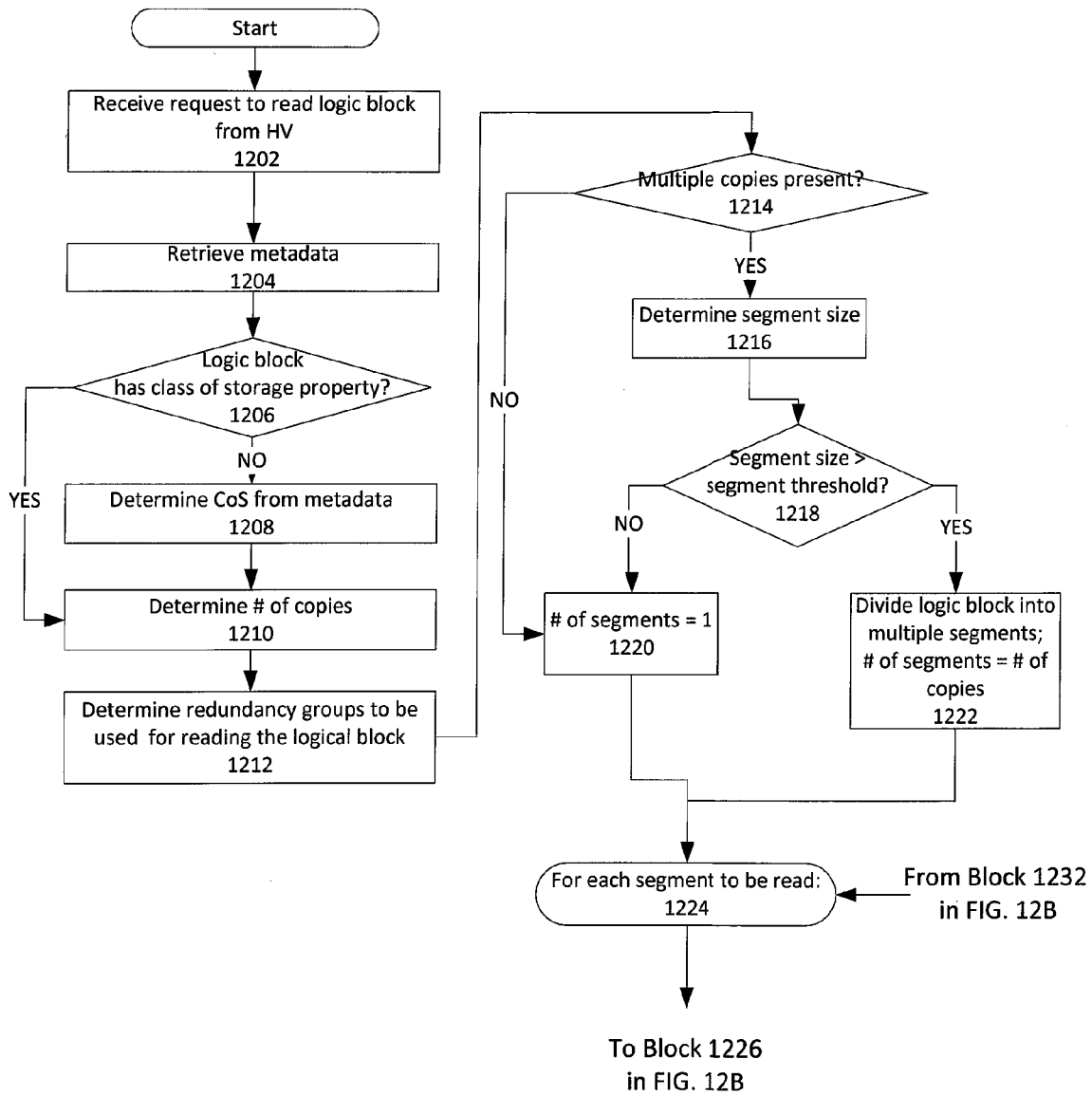
FIG. 12, composed of FIG. 12A and FIG. 12B, shows a flow chart of an exemplary procedure to read a logical block from a heterogeneous data volume in accordance with an embodiment of the invention.
Figure 12B:
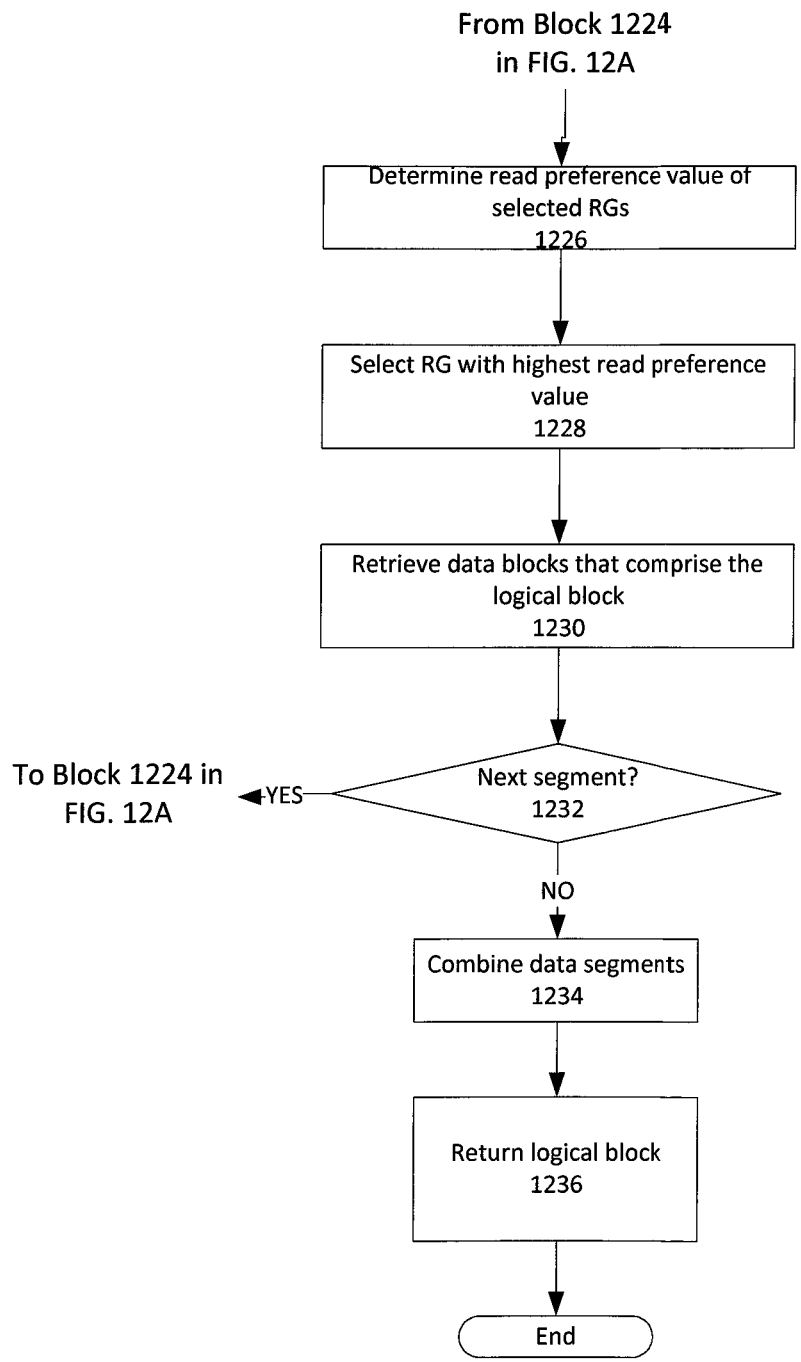

FIG. 12, composed of FIG. 12A and FIG. 12B, shows a flow chart of an exemplary procedure to read a logical block from a heterogeneous data volume in accordance with an embodiment of the invention. Initially, per block 1202, a request is received to read a logical block from the data volume.

The logical block can have metadata associated with it if the application that had written this logical block was not heterogeneous data volume aware or the class of storage associated with this logical block specified more than one copy. The metadata associated with this logical block, if the metadata exists, is retrieved, per block 1204.

Per block 1206, a determination may be made as to whether or not the logical block has an associated class of storage property. If the logical block is not associated with any class of storage, then the class of storage is determined from the metadata associated with the logical block per block 1208.

From the class of storage property associated with the logical block and associated metadata of the logical block, the number of copies of the block in the data volume is determined per block 1210. Per block 1212, the redundancy groups holding the logical block are determined. These redundancy groups are to be used for reading this logical block based on the class of storage of the logical block and the associated metadata. In one embodiment, this determination is made by bitwise AND-ing of the class of storage of the logical block and class of storage of the redundancy groups in the data volume.

Per block 1214, a determination may be made as to whether multiple copies are present. If only one copy is present, then the procedure 1200 moves forward to block 1220. If multiple copies are present, then a further determination may be made as to whether the logical block is to be read in parallel from all the redundancy groups that store a copy of this logical block. Assuming the logical block is to be read in parallel, then, per step 1216, the data segment size may be calculated by dividing logical block size by number of copies.

Next, per block 1218, a determination may be made as to whether the segment size is greater than a configured segment size threshold. Embodiments of the present invention provide for configuring the segment size threshold by the administrator or SMS.

If the segment size is not greater than the segment size threshold, then, per block 1220, the number of segments is one, and the logical block is read by reading from a single copy. On the other hand, if the segment size is greater than the segment size threshold, then, per block 1222, the logical block is read by simultaneously reading the data segments from multiple copies.

One segment may be read from each copy such that the number of segments is equal to the number of copies from the logic block is read in parallel.

Per block 1224, for each segment to be read, the procedural steps given by blocks 1226 through 1230 may be performed. Each segment may be read by issuing the read operation in parallel. Number of segments can be one if there is a single copy of the logical block or the calculated value of the segment size is less than the segment size threshold.

For each segment to be read, a redundancy group for reading the segment is selected. In one embodiment, this selection may be done, per block 1226, based on the read preference value of selected redundancy groups as a function of latency, pending I/O operations on the redundancy group/disks, and cost (in terms of disk space and disk utilization). The cost may be computed for each redundancy group using the COST( )

function described above, for example. The redundancy group with the maximum read preference value is then selected per block 1228.

Per block 1230, once the redundancy group or disk is selected for reading the copy of the logical block, and the replication scheme is determined, then the data segment is retrieved. The data segment may be retrieved using the data access mechanism specific to the class of storage associated with the redundancy group/disks.

Once all the segments are determined to have been read per block 1232, then the logical block. may be formed by combining all the segments per block 1234. Then, per block 1236, the logical block may be returned back to the application that issued the read request.

Note that the algorithm illustrated in FIG. 9 is recursive, with respect to nested redundancy groups. If a given (parent) redundancy group comprises other (child) redundancy groups, a read operation on the parent redundancy group is passed to its children for execution.

Load Balancing of I/O Workflows

The present application discloses a method to automatically and optimally load balance I/O workflows when using two or more types (classes) of disks in a data volume. This involves best-effort matching of I/O requests with the storage tiers and their contained disks of the heterogeneous volume (HV), based on pre-configured or implicitly defined mappings between CoS labels of I/O requests to the underlying storage tiers and their contained disks.

The method detects situations when increased service demand or additional processing stages impose a high load on some system components. The method then re-distributes this load within the system, and maintains the system performance characteristics within the desired ranges.

This method applies to heterogeneous systems that are susceptible to internal load imbalances due to their heterogeneous nature. The method is particularly useful in dynamic environments with unpredictable or variable workloads, where it is difficult to predict, or expensive to pre-provision for, the worst-case loads, and where the elasticity of the I/O processing workflow may be a viable alternative to undesirable system performance drops.

The exemplary embodiments and implementations described above in relation to FIGS. 7 through 12 provide methods that utilize certain system statistics, thresholds and weights that may be selected and configured through a storage management system (SMS). Different system statistics, thresholds and weights may be utilized besides those described above.

For example, while the above description relates to an embodiment that uses low and high watermark thresholds per system statistic, an alternative embodiment may use a single threshold level for each system statistic. In one implementation, when the system statistic crosses the threshold, then the next lower (inferior) storage tier may be deterministically (rather than probabilistically) selected.

The adjustment of the I/O processing workflows using the above-described procedures pursues the following optimization goals: i) maintaining pre-configured mapping of I/O requests to classes of storage in the Static mode; ii) dynamic adjustment of the I/O processing workflow in the Elastic mode to counteract system component overload; iii) suspension of the load in the Disabled mode to allow for restoration of the desired parameter ranges of system components; iv) optimal response time and throughput for the heterogeneous volume as a whole; and v) avoidance of starvation and bottlenecks in any class of storage. A different set of optimization goals may be pursued by making appropriate changes to the procedures.

Automatic Migration in HV

Hierarchical storage management (HSM)-style auto migration between tiers may be configured and orchestrated by the SMS. From the HV's point of view, I/O requests that carry out auto migration may be treated in a manner similar to other I/O requests, assuming that the I/O request CoS label directs data to the proper CoS, and the minimal CoS is reasonably assigned as discussed below.

During automatic migration in HV, the minimal CoS label assists in limiting data movements to the desired range of storage tiers, and allows one to avoid pathological cases when the attempted migration might result in expending the system's resources, yet it does not result in placement of data on the desired range of tiers. For instance, if migration to an upper tier is requested, yet the upper tiers are over-utilized, the desired outcome is to defer such migration, as opposed to attempting one and have the system arrive at a destination tier that is lower than the one where data is presently located.

Conclusion

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of writing data to a heterogeneous data volume (HV) having multiple disk classes of storage, the method comprising:
   receiving a request for a data write;
   setting a class of storage (CoS) tier instance to be a CoS tier of the HV that matches the data write request;
   determining an operating mode of the CoS tier instance; and
   if the operating mode comprises a static mode, then setting a CoS tier for the data write to be the CoS tier instance; and
   if the operating mode comprises a disabled mode, then incrementing the CoS tier instance by changing the CoS tier instance to a next lower CoS tier; and
   if the operating mode comprises an elastic mode, then setting the CoS tier for the data write to be the CoS tier instance with a computed probability, and otherwise incrementing the CoS tier instance by changing the CoS tier instance to the next lower CoS tier.

2. The method of claim 1 further comprising:
   performing a further iteration to set the CoS tier for the data write after the CoS tier instance is incremented by changing the CoS tier instance to the next lower CoS tier.

3. The method of claim 1 further comprising:
   setting the operating mode of the CoS tier instance to the elastic mode when at least one statistical measure of a plurality statistical measures of operating parameters of the CoS tier instance is between lower and upper threshold values.

4. The method of claim 3, wherein the computed probability varies from zero to one and is a function of at least one of the following statistical measures: a measure of used space, a measure of CPU utilization, and a measure of disk utilization associated with the CoS tier instance.

5. The method of claim 1 further comprising:
setting the operating mode of the CoS tier instance to the disabled mode when a statistical measure for an operating parameter is above an upper threshold value.

6. The method of claim 1 further comprising:
setting the operating mode of the CoS tier instance to the static mode when statistical measures for a plurality of operating parameters are all below lower threshold values.

7. The method of claim 1 further comprising:
adjusting services applied for the data write using at least one statistical measure of an operating parameter for the selected CoS tier.

8. The method of claim 7, wherein the services include compression, de-duplication, and checksumming.

9. The method of claim 1 further comprising:
selecting a redundancy group within the selected CoS tier for the data write.

10. The method of claim 9, wherein the redundancy group is selected by:
computing a cost of processing the data write for each redundancy group within the selected CoS tier; and
determining the redundancy group with a lowest value for the cost.

11. The method of claim 10, wherein the cost of processing is computed based on at least one factor from a group of factors including used space and CPU utilization.

12. A data storage system comprising:
a heterogeneous data volume (HV) comprising a plurality of redundancy groups, each redundancy group comprising at least one distinct disk class of storage associated with distinct per class management properties and each redundancy group being a member of one of a plurality of class of storage (CoS) tiers, wherein the plurality of CoS tiers comprise at least two distinct classes of storage;
a mode determination module for determining operating modes for the plurality of CoS tiers using statistical measures of operating parameters and threshold values for the statistical measures; and
a selection module that selects a class of storage for a data write using the operating modes for the plurality of classes.

13. The data storage system of claim 12, wherein the selection module
sets a CoS tier instance to be a CoS tier of the HV that matches the data write request,
determines an operating mode of the CoS tier instance, and
sets a CoS tier for the data write to be the CoS tier instance with a computed probability, and otherwise incrementing the CoS tier instance by changing the CoS tier instance to a next lower CoS tier, if the operating mode of the CoS tier instance comprises an elastic mode.

14. The data storage system of claim 13, wherein the computed probability varies from zero to one and is a function of the at least one statistical measure.

15. The data storage system of claim 13, wherein the selection module sets the operating mode of the CoS tier instance to the elastic mode when at least one statistical measure of an operating parameter for the CoS tier instance is between lower and upper threshold values.

16. The data storage system of claim 15, wherein the statistical measures include a measure of used space at the CoS tier instance, a measure of disk utilization at the CoS tier instance, and a measure of central processing unit utilization at the CoS tier instance.

17. The data storage system of claim 13, wherein the selection module increments the CoS tier instance by changing the CoS tier instance to the next lower CoS tier if the operating mode of the CoS tier instance comprises a disabled mode.

18. The data storage system of claim 17, wherein the selection module sets the operating mode of the CoS tier instance to the disabled mode when at least one statistical measure for an operating parameter is above an upper threshold value.

19. The data storage system of claim 13, wherein the selection module selects the CoS tier instance for the data write if operating mode of the CoS tier instance comprises a static mode.

20. The data storage system of claim 19, wherein the selection module sets the operating mode of the CoS tier instance to the static mode when the statistical measures of the operating parameters are all below lower threshold values.

21. The data storage system of claim 12 further comprising:
a service label adjusting module for modifying services requested for the data write using at least one statistical measure of an operating parameter for the selected CoS tier.

22. The data storage system of claim 12, wherein the selection module further selects a redundancy group within the selected CoS tier for the data write.

23. The data storage system of claim 22, wherein the redundancy group is selected by:
computing a cost of processing the data write for each redundancy group within the selected CoS tier; and
determining the redundancy group with a lowest value for the cost.

* * * * *